United States Patent
Whiteman

(10) Patent No.: US 10,995,024 B2
(45) Date of Patent: May 4, 2021

(54) METHODS OF REDUCING THE AMOUNT OF SETTLING AID

(75) Inventor: G. Robert Whiteman, Duluth, GA (US)

(73) Assignee: Advanced Biological Services, Inc., Fleming Island, FL (US)

(*) Notice: Subject to any disclaimer, the term of this patent is extended or adjusted under 35 U.S.C. 154(b) by 0 days.

(21) Appl. No.: 12/640,913

(22) Filed: Dec. 17, 2009

(65) Prior Publication Data
US 2010/0089824 A1 Apr. 15, 2010

Related U.S. Application Data

(60) Division of application No. 10/395,424, filed on Mar. 24, 2003, now Pat. No. 7,879,593, which is a continuation-in-part of application No. 09/737,718, filed on Dec. 15, 2000, now abandoned.

(60) Provisional application No. 60/171,264, filed on Dec. 16, 1999.

(51) Int. Cl.
| | |
|---|---|
| *C02F 1/00* | (2006.01) |
| *C02F 3/00* | (2006.01) |
| *C02F 3/30* | (2006.01) |
| *C02F 3/12* | (2006.01) |
| *C02F 3/28* | (2006.01) |
| *C02F 3/34* | (2006.01) |
| *G06Q 10/00* | (2012.01) |

(52) U.S. Cl.
CPC ............ *C02F 3/006* (2013.01); *C02F 3/12* (2013.01); *C02F 3/28* (2013.01); *C02F 3/30* (2013.01); *C02F 3/348* (2013.01); *G06Q 10/30* (2013.01); *H05K 999/99* (2013.01); *C02F 3/00* (2013.01); *C02F 3/34* (2013.01); *C02F 2209/02* (2013.01); *C02F 2209/05* (2013.01); *C02F 2209/06* (2013.01); *C02F 2209/08* (2013.01); *C02F 2209/10* (2013.01); *C02F 2209/11* (2013.01); *C02F 2209/22* (2013.01); *C02F 2209/42* (2013.01); *C02F 2303/12* (2013.01); *C02F 2305/06* (2013.01); *Y02W 10/10* (2015.05); *Y02W 90/00* (2015.05)

(58) Field of Classification Search
CPC .... C02F 3/006; C02F 3/30; C02F 3/12; C02F 3/28; C02F 3/348; C02F 3/00; C02F 3/34; C02F 2209/02; C02F 2209/05; C02F 2209/06; C02F 2209/08; C02F 2209/10; C02F 2209/11; C02F 2209/22; C02F 2209/42; C02F 2303/12; C02F 2305/06; G06Q 10/30; H05K 999/99; Y02W 10/10; Y02W 90/00

USPC ............................................... 435/262
See application file for complete search history.

(56) References Cited

U.S. PATENT DOCUMENTS

| | | | |
|---|---|---|---|
| 3,607,737 A | 9/1971 | Garner | |
| 3,635,797 A | 1/1972 | Battistoni et al. | |
| 3,979,283 A | 9/1976 | Prudom | |
| 4,009,119 A | 2/1977 | Poschmann et al. | |
| 4,554,075 A | 11/1985 | Chang et al. | |
| 4,649,117 A | 3/1987 | Famillietti | |
| 4,693,833 A * | 9/1987 | Toshikuni et al. | 210/759 |
| 4,822,490 A | 4/1989 | Dyadechko et al. | |
| 4,894,342 A | 1/1990 | Guinn et al. | |
| 5,369,031 A | 11/1994 | Middleditch et al. | |
| 5,407,577 A * | 4/1995 | Nghiem | C02F 3/34 |
| | | | 210/606 |
| 5,449,619 A | 9/1995 | Griffin et al. | |
| 5,470,460 A | 11/1995 | Pertsov et al. | |
| 5,798,253 A | 8/1998 | Bartholmes et al. | |
| 5,807,485 A * | 9/1998 | Caplan et al. | 210/610 |
| 5,821,112 A | 10/1998 | Botto et al. | |
| 5,833,857 A | 11/1998 | Roth | |
| 5,846,425 A | 12/1998 | Whiteman | |
| 5,866,002 A | 2/1999 | Yates et al. | |
| 5,877,113 A * | 3/1999 | Mehta | A01N 63/00 |
| | | | 435/262 |
| 5,879,928 A | 3/1999 | Dale et al. | |
| 5,888,396 A * | 3/1999 | Perriello | 210/611 |
| 5,888,805 A | 3/1999 | Endo et al. | |
| 5,980,748 A | 11/1999 | Auger et al. | |
| 5,981,260 A | 11/1999 | Metz | |
| 6,136,193 A | 10/2000 | Haase | |
| 6,649,401 B2 | 11/2003 | Tisinger et al. | |

(Continued)

FOREIGN PATENT DOCUMENTS

| | | |
|---|---|---|
| EP | 0 714 858 B1 | 8/2000 |
| EP | 1 063 202 A2 | 12/2000 |

(Continued)

OTHER PUBLICATIONS

"Drinking water contaminants." Jul. 27, 2009. Accessed onlineFeb. 10, 2010 at <url:www.epa.gov/ogwdw000/hfacts.html>. 7 pages.*

(Continued)

*Primary Examiner* — Sharmila G Landau
*Assistant Examiner* — Natalie M Moss
(74) *Attorney, Agent, or Firm* — Glen P. Belvis; Belvis Law, LLC.

(57) ABSTRACT

The present invention relates to apparatus, methods, and applications for treating wastewater, and more particularly to biological processes for removing pollutants from wastewater. This invention further relates to apparatus and methods for growing microbes on-site at a wastewater treatment facility, and for economically inoculating sufficient microbes to solve various treatment problems rapidly.

8 Claims, 7 Drawing Sheets

(56) References Cited

U.S. PATENT DOCUMENTS

2002/0117445 A1   8/2002   Whiteman
2003/0186036 A1*  10/2003  Goodell et al. ............ 428/292.4

FOREIGN PATENT DOCUMENTS

JP    58156397    9/1983
JP     7132078    5/1995

OTHER PUBLICATIONS

"Radiation: Discharges of radioactive material to the environment." 2010. Accessed online at <url:www.dec.ny.gov/chemical/296.html>, 4 pages.*

Hiraishi A et al. 2001. Toward the bioremediation of dioxin-polluted soil: structural and functional analyses of in situ microbial populations by quinone profiling and culture-dependent methods. Appl Microbiol Biotechnol 57: 248-256. Abstract only.*

King RB et al. 1998. Practical environmental bioremediation: The field guide. CRC Press, Boca Raton. pp. 4 and 7-9.*

Pillai et al. (Flocculants and Coagulants: The Keys to Water and Waste Management in Aggregate Production. Nalco pp. 1-5, 1997).*

Herbert et al. (A new chemically-defined medium for Bacillus subtilis (168) NCIMB 12900. Letters in Applied Microbiology 1996, 22, 18-20).*

Leitch et al. (A new chemically-defined medium for Bacillus subtilis (168) NCIMB 12900. Letters in Applied Microbiology 1996, 22, 18-20).*

Greville et al. (How to Select a Chemical Coagulant and Flocculant. Alberta Water & Wastewater Operators Association 22th Annual Seminar 1997, pp. 1-24).*

American Type Culture Collection—"Catalogue of Bacteria and Bacteriophages", Seventeenth edition (1989).

Atlas R.M. and Parks L.C., "Handbook of Microbiological Media," CRC Press, Inc. (1993).

Buchanan and Edelson, "Culturing Enterohemorrhagic *Escherichia coli* in the Presence and Absence of Glucose as a Simple Means of Evaluating the Acid Tolerance of Stationary-Phase Cells," *Applied and Environmental Microbiology*, 62(11):4009-4013 (1996).

Board R.G., et al., "Identification Methods in Applied and Environmental Microbiology," *The Society for Applied Bacteriology Technical Series No. 29*, Blackwell Scientific Publications, London (1992).

Catalogue of the National Collection of Type Cultures (NCTC); Catalogue of the Plasmid Section, National Collection of Type Cultures; and Catalogue of the National Collection of Pathogenic Fungi, Public Health Laboratory Service (PHLS) (1989).

Foster, M.H., et al., "Bioaugmentation Aids Wastewater Systems," Nalco Chemical Co., Reprint No. 587, *Environmental Protection*, (1992).

Kaal Erwin E.J., et al., "Increasing Ligninolytic Enzyme Activities in Several White-Rot Basidiomycetes by Nitrogen Sufficient Media," *Bioresource Technology* 53: 133-139 (1995).

Krieg N.R. and Holt J.G., "Bergey's Manual of Systematic Bacteriology," Williams & Wilkins Baltimore, vol. 1 (1984).

Lehninger A.L., Biochemistry, Second Edition, Worth Publishers, Inc. (1975).

Levy J., et al., Introductory Microbiology, John Wiley & Sons, Inc., (1973).

Nghiem, J.P., et al., The Application of Selected Microbial Formulations in the Pulp and Paper Industry, *TAPPI Environmental Conference*, Book, pp. 235-238, San Antonio, TX (1991).

Rittmann, B.E. and Whiteman, G.R., "Bioaugmentation: A Coming of Age," *Water Quality International*, No. 1, pp. 12-14 (1994).

Rittmann, B.E. and Whiteman, G.R., "Advances in Sequencing Brings use of New Tools," *Water Quality International*, No. 1, pp. 14-16 (1994).

Sneath P.H.A., et al., "Bergey's Manual of Systematic Bacteriology," Williams & Wilkins Baltimore, vol. 2 (1986).

Staley J.T., et al., "Bergey's Manual of Systematic Bacteriology," Williams & Wilkins Baltimore, vol. 3 (1989).

Watkinson R.J., "Developments in Biodegradation of Hydrocarbons-1," Applied Science Publishers LTD London (1978).

Williams, S.T., et al., "Bergey's Manual of Systematic Bacteriology," Williams & Wilkins Baltimore, vol. 4 (1989).

Whiteman, G.R., et al., "The Application of Selected Microbial Formulations for Enhancing BOD Removal and Residence Time Studies," *Proc. TAPPI Environmental Conference*, Book 3, pp. 773-781, Richmond, VA (1992).

Whiteman, G.R., "Optimizing Biological Processes—'A Look Inside the Black Box," *Gwinnett Industrial Conference*, Duluth, GA (1995).

Whiteman, et al., "Improving Treatment Performance with 'Natural' Bioaugmentation," *Proc. TAPPI Environmental Conference*, Vancouver, Canada (1997).

Whiteman, G.R., "The Application of Selected Miro-Organisms to an Aerobic Waste Water Treatment Plan in the Chemical Industry," *Proc. Chemical Waste Management*—On Site or Off, Mancherster, U.K., Oct. 1989.

Whiteman, G.R., "Filamentous and Dispersed Growth in Anaerobic Contact Systems," Ph.D. Thesis, University of Newcastle-upon-Tyne, England or Advanced Biological Services (ABS) Inc., Duluth, Ga. USA (1985).

"Case Study—Biological Additive INOC™ 8166 Allows Nitrification of Wastewater Treatment Plant," Nalco Chemical Co. Reprint No. CH-241, case study was supplied courtesty of InterBio, Inc. (1991).

International Search Report or the Declaration for PCT patent application No. PCT/US00/34197.

40 USC § 131.36, Apr. 12, 2000, "Toxics criteria for those states not complying with Clean Water Act Section 303(c)(2)(B)," pp. 1120-1135.

Todar's Online Textbook of Bacteriology's entry on The Genus *Bacillus* [online]. University of Wisconsin-Madison, not dated. Retrieved from the Internet. <URL: textbookofbacteriology.net/Bacillus.html>.

AgBioSafety Glossary of Terms [online]. University of Nebraska-Lincoln, 2006 Retrieved from the Internet: URL:agbiosafety.unl.edu/glossary.htm.

BI-CHEM LC 2009GT [online]. Novozymes, Inc., not dated. Retrieved from the Internet: URL:www.novozymes.com/en/MainStructure/ProductsAndSolutions/Bioaugmentation++bioremediation/Municipal+wastewater+treatment/BI-CHEM+2009GT/BI-CHEM+LC+2009GT.htm>.

Bi-Chem LC 2009 GT: improved with Patented BioS 3112. 2007. Novozymes, Inc. Available online <http://www.novozymes.com/NR/rdonlyres/726EEFB6-B097-4675-P2EB-9E3AB7BC36D5/0/BICHEMLC2009GTPDS.pdf.> retrieved from the Internet Dec. 18, 2007. 3 pages.

Case Study—1, Copyright ABS, Inc., 2005.
Case Study—2, Copyright ABS, Inc., 2005.
Case Study—3, Copyright ABS, Inc., 2005.
Case Study—6, Copyright ABS, Inc., 2005.

U.S. Appl. No. 12/043,720, filed Mar. 6, 2008, entitled "Apparatus For Treating Wastewater," Whiteman.

U.S. Appl. No. 12/044,293, filed Mar. 7, 2008, entitled "Methods and Kits for Bioremediation of Contaminated Soil," Whiteman.

\* cited by examiner

CONCEPTUAL DIAGRAM OF FERMENTATION PROCEESS

White = General System
Gray = Additional Tanks
Stripes = Monitoring Devices

Pre-Fermentation Tank

Storage Tank
Automated Feeding tank

Fermentation Nutrients

Main Fermentation Tank

Monitoring & Remote Control

Post-Fermentation Tank

Point of Application
26

Holding Tank

METHODS OF REDUCING THE AMOUNT OF SETTLING AID

RELATED APPLICATIONS

The present patent document is a divisional application of a U.S. patent application Ser. No. 10/395,424 filed Mar. 24, 2003 now U.S. Pat. No. 7,879,593, which is a continuation-in-part of application Ser. No. 09/737,718 filed Dec. 15, 2000 now abandoned, which claims the benefit of the filing date under 35 U.S.C. § 119(e) of Provisional U.S. Patent Application Ser. No. 60/171,264 filed Dec. 16, 1999. All of the foregoing applications are hereby incorporated by reference.

BACKGROUND

In the treatment of wastewater, microorganisms mostly bacteria use the soluble organic matter in the water as a food source. The bacteria consume the organic compounds and convert them to carbon dioxide, water, and energy to produce new cells.

The use of microbes for wastewater treatment and environmental clean up of contaminated soils is well known. Examples of this can be seen in industry, such as microbial products sold to biological wastewater treatment plants (WWTP) by United States based companies such as Novozymes of Salem, Va. (Novozymes Biologicals, Inc.); InterBio, Inc. of The Woodlands, Tex.; Sybron Corporation of Birmingham, N.J.; or Polybac Corporation of Bethlehem, Pa. These microbial products target various problems associated with the operation of the treatment systems.

The basis of these commercial products is the isolation or pre-selection of microbes from different environments other than the actual site being treated. These non-indigenous microbes, hereafter referred to as "exogenous" microbes, are isolated by such companies and grown or fermented under controlled conditions in a manufacturing facility. From the fermenter, the pure culture of microbes is concentrated into a paste, reconstituted, and placed on an inert carrier, such as bran, oatmeal, rye, or cornhusks. These carrier materials are often sterilized to reduce the natural background contamination with other undesirable fecal organisms or unwanted microbes. These unwanted or non-target microbes can become a significant part of the final product. This reconstituted mixture then undergoes a stabilization procedure, usually freeze-drying. Even with the use of cryo-protectants in the reconstituted mixture to protect the microbes, this process generally kills in excess of 90% of the microbes. Therefore only about 1-10% of the microbes can be recovered after freeze-drying. Air-drying, a post liquid fermentation process, is also used by some companies to stabilize the microbes, but still results in high losses and poor recovery of viable microbes. After stabilization, different microbes are blended into formulations to address different operational problems or to biodegrade various environmental pollutants.

The process of adding these exogenous microbes to a biological wastewater treatment system is termed "bioaugmentation," because it is adding or enhancing the existing biological fauna. Using current technologies, the application of exogenous microbes often has no effect or insufficient impact, resulting in the plant violating National Pollutant Discharge Elimination System (NPDES) permits issued by the Environmental Protection Agency (EPA), or violating other environmental regulations, including state or local environmental regulations, and environmental regulations of countries other than the United States. Currently, the typical reaction time is 2-3 weeks for bioaugmentation to take effect. Since the NPDES Permits are monthly, this only leaves about two weeks or less to identify that the NPDES Permit is jeopardized, which is insufficient time for the plant to address the problem.

There is a need to be able to quickly, reliably, and economically control biological wastewater treatment plant upsets in order to decrease the levels of contaminants in wastewater and to avoid violation of NPDES Permits and other environmental regulations regarding pollutant discharge.

BRIEF SUMMARY

The present invention relates to apparatus, methods, and applications for treating wastewater, and more particularly to biological processes for removing pollutants from wastewater. This invention further relates to apparatus and methods for growing microbes on-site at a wastewater treatment facility, and for economically inoculating sufficient microbes to solve various treatment problems rapidly. The system may be applied to growing microbes on-site for clean up of contaminated soils or groundwater treatment. The system may also be modified to become a specialized treatment system for biodegradation of liquid hazardous wastes on-site, eliminating the need for hauling away hazardous wastes for remote disposal.

The fermentation system of the present invention provides numerous improvements in bioaugmentation systems by increasing the efficiency of wastewater treatment. In accordance with the present invention, a fermentation system for providing microbes to degrade waste organic compounds present in a water mixture comprises a fermentation tank provided with aeration, mixing, and maintained within a given temperature range. Further, in accordance with the present invention, a carbon source, nutrients and selected microbes are provided.

In one aspect of the present invention, the fermentation system is on-site at the waste water treatment plant (WWTP), thereby reducing high shipping costs of transporting the inoculum to the WWTP.

In another aspect of the present invention, the effective concentration of the desired or target microbes in the inoculum with which the wastewater is treated is increased, thereby increasing the efficacy and efficiency, and thereby reducing the per unit cost of treatment.

In another aspect of the present invention, isolation of the indigenous functional, desired, or target microbes and fermentation on-site, outside the competitive environment of the WWTP, enhances the efficacy and effectiveness of such applications, since the indigenous population tends to have more stable genetic characteristics.

In another aspect of the present invention, the proportion of target, functional microbes in the inoculum is increased, and the proportion of non-target, non-functional microbes is decreased, adding to the efficacy and efficiency of dosing at the point of application.

In another aspect of the present invention, the inoculum is fed into the fermentation tank through an automated process.

In another aspect of the present invention, various parameters of the fermentation system are monitored and controlled, such as pH, temperature, nutrients, carbon sources, aeration, and mixing.

In another aspect of the present invention, various parameters of the fermentation system are monitored and controlled through an automated process.

In another aspect of the present invention, various parameters of the fermentation system are monitored and controlled from a remote location.

In another aspect of the present invention, there is provided a method of removing contaminants from an aqueous liquid comprising depositing an inoculum comprising microbes into a fermentation system; fermenting the inoculum in the fermentation system to provide a treatment batch comprising the microbes; and applying at least a portion of the treatment batch to an aqueous liquid.

In another aspect of the present invention, there is provided a method of removing contaminants from an aqueous liquid, comprising depositing an inoculum comprising microbes into a fermentation system in a concentration of $10^3$ cfu/ml to $10^8$ cfu/ml; fermenting the inoculum in the fermentation system to provide a treatment batch comprising the microbes in a concentration of $10^6$ cfu/ml to $10^{10}$ cfu/ml; and applying at least a portion of the treatment batch to an aqueous liquid to provide a microbe concentration in the aqueous liquid of at least $10^3$ cfu/ml.

In another aspect of the present invention, there is provided a method of removing contaminants from an aqueous liquid, comprising: depositing an inoculum comprising microbes into a fermentation system; adding nutrient, water and defoamer to the fermentation system to provide a fermentation mixture; fermenting the fermentation mixture to provide a treatment batch comprising the microbes; and applying at least a portion of the treatment batch to an aqueous liquid. The fermenting may comprise heating, mixing and aerating the mixture in the fermentation system.

In another aspect of the present invention, there is provided a method of removing contaminants from wastewater in a biological wastewater system, comprising depositing an inoculum comprising microbes into a fermentation system in a concentration of $10^3$ cfu/ml to $10^8$ cfu/ml; fermenting the inoculum in the fermentation system to provide a treatment batch comprising the microbes in a concentration of $10^6$ cfu/ml to $10^{10}$ cfu/ml; and releasing at least a portion of the treatment batch directly into the wastewater to provide a microbe concentration in the wastewater of at least $10^3$ cfu/ml.

In another aspect of the present invention, there is provided a method of removing organic contaminants from a wet well, comprising depositing an inoculum comprising microbes into a fermentation system; adding nutrient, water and defoamer to the fermentation system to provide a fermentation mixture; fermenting the fermentation mixture to provide a treatment batch comprising the microbes, the fermenting comprising heating, mixing and aerating the mixture in the fermentation system; and applying at least a portion of the treatment batch to a wet well. The organic contaminants may comprise fat, oil, grease, or mixtures thereof.

In another aspect of the present invention, there is provided a method of removing contaminants from soil, comprising depositing an inoculum comprising microbes into a fermentation system; adding nutrient, water and defoamer to the fermentation system to provide a fermentation mixture; fermenting the fermentation mixture to provide a treatment batch comprising the microbes; and applying at least a portion of the treatment batch to a soil surface. The fermenting may comprise heating, mixing and aerating the mixture in the fermentation system In another aspect of the present invention, there is provided a method of reducing the time required for coming into compliance with an environmental discharge regulation comprising fermenting an inoculum comprising microbes to provide a treatment batch; and administering at least a portion of the treatment batch to a wastewater treatment system.

In another aspect of the present invention, there is provided a method of reducing the cost required for coming into compliance with an environmental discharge regulation comprising fermenting an inoculum comprising microbes to provide a treatment batch; and administering at least a portion of the treatment batch to a wastewater treatment system. The cost required for coming into compliance with the environmental discharge regulation may be reduced by at least about 25 percent.

In another aspect of the present invention, there is provided a method of reducing the amount of settling aid required by a wastewater treatment system comprising fermenting an inoculum comprising microbes to provide a treatment batch; and administering at least a portion of the treatment batch to a wastewater treatment system. The amount of settling aid used in the wastewater treatment system may be reduced by at least about 25 percent.

DETAILED DESCRIPTION

Figure 1:
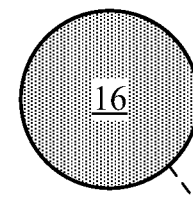
FIG. 1 Conceptual Diagram of Fermentation Process
Figure 1:
Figure 1:
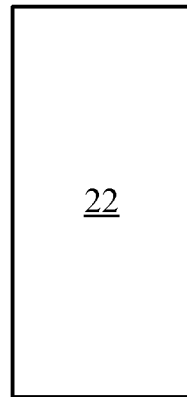
Figure 1:
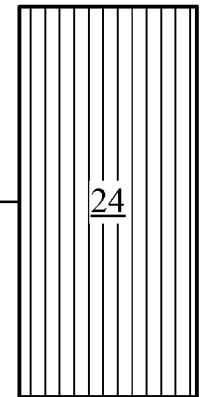
Figure 1:
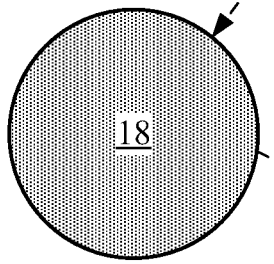
Figure 1:
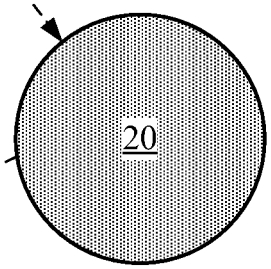
Figure 2:
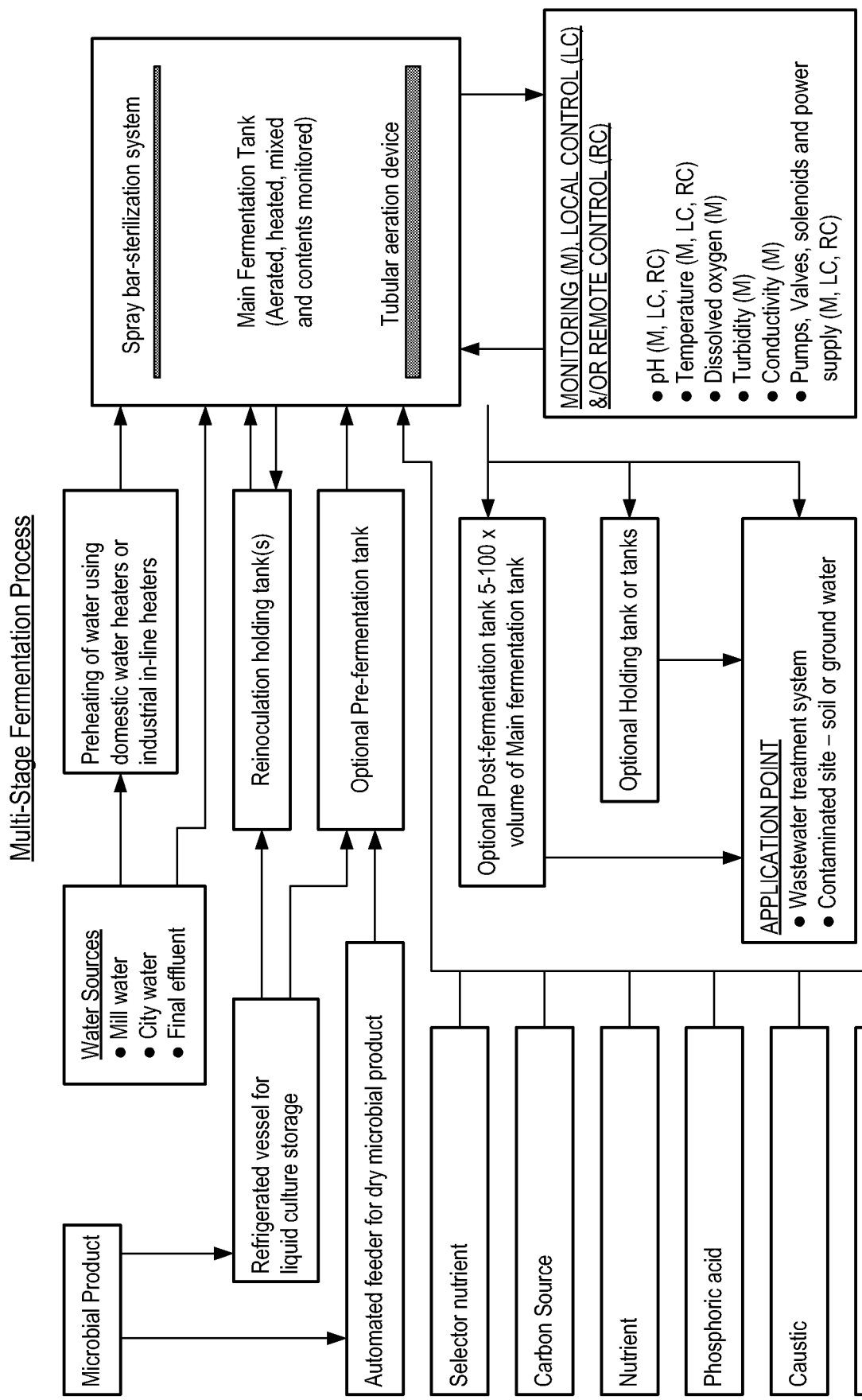
FIG. 2 Multi-Stage Fermentation Process Flow Diagram
Figure 3:
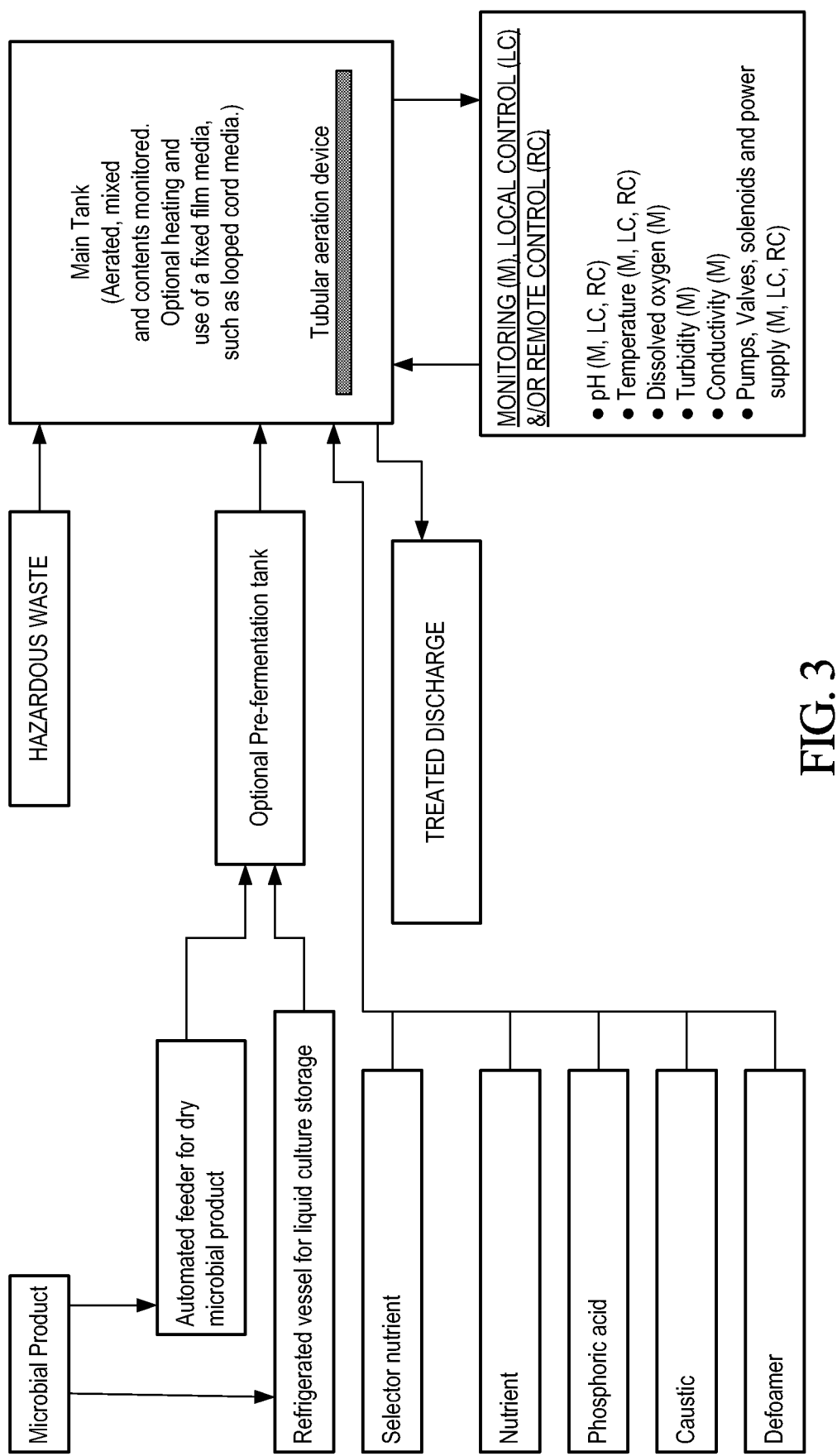
FIG. 3 Modified Multi-Stage Fermentation Process To Hazardous Waste Treatment Process Flow Diagram FIG. 4 Diagram of Spray Bar FIG. 5 Schematic Diagram of Automated Fermentation System FIG. 6 Schematic Diagram Multi-stage Fermentation System FIG. 7 Schematic Diagram of One Embodiment of Manual Fermentation System FIG. 8 Schematic Diagram of One Embodiment Automated Fermentation System

The apparatus and methods of the present invention provide a quick, reliable, and economical way of controlling biological wastewater treatment plant upsets in order to avoid violation of environmental discharge regulations such as NPDES Permits, other discharge permit requirements, or other environmental regulations regarding limits on effluent materials that can be introduced into the environment. Such regulations vary from state to state, and from country to country. The terms "environmental discharge regulation" and "discharge permit" are used to describe such permits and regulations including, but not limited to, NPDES Permits, other discharge permit requirements, or other environmental regulations regarding limits on effluent materials that can be introduced into the environment. Optimally, this involves an on-site fermentation process, which can increase the effective dosage of microbes by 10-100 fold or more over the existing technology. In one embodiment, the fermentation system is an on-site, automated, continuous fermentation system with the features of deliberate aeration, heating, automated sterilization, automated feeding of raw materials, automated inoculation, with multi-stage fermentation vessels or multiple daily cycles along with remote monitoring capability of the process for quality assurance and quality control purposes. In addition, the system may be weatherproof for on-site application and capable of automated inoculation and re-inoculation from one batch to the next.

This apparatus may be applied to a range of aerobic, facultative, or anaerobic biological wastewater systems.

Aerobic processes include, for example, activated sludge systems, aerobic stabilization basins (ASB), aerated lagoons, single pass lagoon systems, stabilization ponds, rotating biological contactors, and trickling filters. Facultative processes include, for example, facultative lagoons. Anaerobic processes include, for example, anaerobic ponds, anaerobic digesters, anaerobic filters or contactors, and anaerobic treatment systems. Different microbes are grown to address different environmental or operational problems, including psychrophilic, mesophilic, or thermophilic heterotrophs for biodegrading organic pollutants or lithotrophs, such as nitrifying bacteria (*Nitrosomonas* and/or *Nitrobacter*) for nitrification. For anaerobic processes, microbes such as methanogens, methylotrophs or other anaerobic synthrophic microbes may be grown. Names of useful anaerobic microbes can be found in "Filamentous and Dispersed Growth in Anaerobic Contact Systems, G. R. Whiteman, Ph.D. Thesis, 1985 University of Newcastle-upon-Tyne, England or Advanced Biological Services (ABS) Inc., Duluth, Ga. USA, which is incorporated herein by reference.

The use of the functional, target, or desired indigenous microbes (referred to as target indigenous microbes) isolated from the biological WWTP for growth in such an apparatus enhances its effectiveness further by dosing high numbers of active, acclimated microbes. The process of using such indigenous microbes has been termed Natural Bioaugmentation.

One aspect of the present invention is the sufficient, repeated inoculation of the functional microbes (whether an exogenous or indigenous source) that allows a microbial population to be established quickly and out-compete an undesirable indigenous population, such as filamentous or Zoogloeal type microbes, which cause bulking. There is a tremendous commercial need to solve such problems as filamentous or Zoogloeal bulking, which can increase the total costs of operating a wastewater treatment plant by as much as 20-25%. The first area of increased treatment costs arise because of the need to use settling aids or chemicals to clarify the water and concentrate the biomass in the secondary clarifier. Examples of such chemicals include polymer, bentonite, alum, or ferric salts. The second area of increased costs arise due to the poor dewaterability of filamentous and Zoogloeal growth, thereby increasing the use of polymer for dewatering, and hence the costs. The fermentation system of the present invention provides a process which is applied to control or displace undesirable microbes, such as filamentous or Zoogloeal type microbes which cause bulking and settleability problems. The fermentation process is used to decrease or eliminate the use of polymers to enhance settling, to minimize the use of dewatering chemicals, and to minimize the need for sludge handling and disposal.

In accordance with one embodiment of the present invention, a fermentation apparatus comprises a fermentation tank provided with a gas transfer system and mixing, and maintained within a given temperature range. The gas transfer system may provide aeration when growing aerobic microbes, or recirculation of anaerobic gases, such as methane, hydrogen, and carbon dioxide, when growing anaerobic microbes. The process of gas transfer may provide sufficient mixing, or mixing may be provided by a separate mechanism. The desired temperature range may be maintained through the use of a heating source. Alternatively, the desired temperature of the fermentation tank may be maintained by locating the tank in an area with the appropriate ambient temperature. For example, the tank may be located in a factory or mill in proximity to some type of equipment which generates enough heat to heat the tank to the desired temperature.

Fermentation nutrients such as carbon sources and additional nutrients are also provided into the fermentation tank. These nutrients may be provided manually, or through the use of an automated system which feeds the fermentation nutrients directly into the fermentation tank.

One aspect of the present invention is to provide an effective concentration of desired microbes at a point of application sufficient to significantly treat the wastewater at the application point. Optimally, the inoculum is grown to a concentration of approximately $10^9$-$10^{10}$ colony forming units per milliliter (cfu/ml) to achieve a preferred minimum inoculation of approximately $10^4$ cfu/ml at the point of application.

The foregoing is illustrated by the following example of an industry with a 40 million gallons per day (MGD) flow of wastewater. An inoculation of approximately $10^4$ cfu/ml is provided to the 40 MGD flow of wastewater by using a 400 gallon tank of inoculum grown to $10^{10}$ cfu/ml, a 4000 gallon tank of inoculum grown to $10^9$ cfu/ml, or a 40,000 gallon tank of inoculum grown to $10^8$ cfu/ml.

Clearly, the volume of inoculum required, the effective concentration of the inoculum required, and the volume of wastewater to be treated are all interdependent. Further, the optimal numbers provided here, of the inoculum being grown to a concentration of approximately $10^9$-$10^{10}$ cfu/ml, and of achieving approximately $10^4$ cfu/ml at the point of application, are based on organisms currently used and commonly known. One of ordinary skill in the art can determine what effective dosage of microbes is best, and as microbes are discovered that are more efficient in degrading contaminants, lower levels of those microbes may be required.

In one embodiment, microbes are provided for treatment of various wastewater problems in the following manner. An inoculum of microbes is provided into a fermentation tank. Fermentation nutrients required for microbial growth, such as carbon sources, macro- and micro-nutrients, selective carbon sources, and selective nutrients are also supplied. Preferably, air and mixing are also supplied. The inoculum is grown in the fermentation tank for a sufficient number of generations until reaching the desired concentration of cfu/ml. Then the inoculum is provided at the point of application for wastewater treatment.

The types of microbe or microbes present in the inoculum depend on the type of wastewater to be treated. The inoculum may contain a single strain or multiple strains of microbes depending on the wastewater problem being addressed. Inoculum may be provided as a liquid or a dry product. Dry product is commonly freeze dried or air dried. Additionally, the microbes may be exogenous to the wastewater or indigenous microbes may be isolated from the wastewater under treatment.

The fermentation process can be carried out in multiple tanks or in a single multi-compartmentalized tank. One advantage of using multiple tanks is to reduce the scale at the front end of the process, thereby, reducing the amount of inoculum which must be stored, reducing the cost, and increasing the efficiency.

For example, if a final concentration of $10^9$ cfu/ml is desired, a fermentation tank can be inoculated with a $10^9$ cfu/ml mother culture in a volume one-hundredth that of the fermentation tank. The term mother culture is used to refer to the desired, functional or target microbe required to achieve the treatment goals, or the original culture of microbes used for inoculation. The source of the microbes in the mother culture may be exogenous or indigenous microbes. This yields a starting concentration in the fermentation tank of $10^7$ cfu/ml. To grow from $10^7$ cfu/ml to $10^9$ cfu/ml, the culture must grow 100 fold, or approximately seven generation times. If, for example, the doubling time for a given bacterial strain is one-half hour, it would take approximately three and one-half hours to grow from $10^7$ cfu/ml to $10^9$ cfu/ml, at which concentration, the batch would be ready to release at the point of application.

The inoculum provided at the start of a fermentation batch is optimally about $10^6$-$10^7$ cfu/m, and may be in the range of about $10^3$ to $10^8$ cfu/ml. By inoculating with a concentration of microbes at about $10^7$ cfu/ml, it is likely that the target microbe of the inoculum would be able to overwhelm any background contamination that may be present.

In accordance with the present invention, it is possible to multicycle the growth of microbes on a daily basis. In other words, depending on the generation time of the microbe in question, it may be possible to grow more than one batch of inoculum in a single day. The various batches may comprise the same or a different microbe or group of microbes. The time required for the growth of a batch of microorganisms depends on the doubling time, or generation time, for the organism. The optimal concentration of microbes also depends on the type of microbe used, and how efficient the microbe degrades the organic in question. What is required is an "effective dosage of organisms" to enhance the efficacy of the treatment.

It is well known that Gram negative microbes such as *Pseudomonas* species are the workhorses of most industrial biological treatment systems. (The Gram stain is a basic criteria used to categorize groups of bacteria, as either Gram positive or Gram negative, based on differential staining of the bacterial cell wall.) Occasionally, Gram positive microbes will dominate waste streams containing large amounts of carbohydrate materials, such as molasses or starch.

The industry competitive standard for exogenous microbial products is $10^9$ colony-forming units per gram (cfu/g). Generally, off-the-shelf commercially available exogenous microbial products contain about 1-10% target, deliberately added Gram negative microbes, such as a *Pseudomonas*. This means that the viable counts for the non-fecal, Gram negative microbes only range from $10^7$ to $10^8$ cfu/g.

These microbial products are generally filled with easy-to-grow, "non-functional" or "non-target" microbes, such as the Gram positive *Bacillus*, rather than Gram negative microbes, such as *Pseudomonas* species, in order to meet the industry competitive standard of $10^9$ colony-forming units per gram (cfu/g). *Bacillus* species are a Gram positive rod-shaped microbe, which form spores when exposed to non-ideal conditions. These microbial spores are the inert, non-active form of the microbe. Generally, any upset biological treatment plant has non-ideal conditions to which the indigenous microbial fauna have been exposed and generally continue to be exposed, which is why the natural biology recovers slowly. For these reasons, any *Bacillus* species will tend to form spores when introduced into the treatment system, and, therefore, will provide no beneficial effect to enhancing the biology of the process.

The microbes found in biological treatment systems often carry extraneous genetic information in the form of plasmids for biodegrading environmental pollutants, such as toluene, xylene, naphthalene, and other organics. In the process of manufacturing the microbes, reversion or loss of these plasmids is common, since there is no selective pressure for the microbe to maintain the plasmid. In other words, this extraneous genetic information is not essential to growth and reproduction of the microbe under the ideal conditions found in a conventional manufacturing facility. Loss of the plasmid encoding the information for toluene biodegradation, for example, makes the microbe ineffective in treating that pollutant.

The type of microbe or microbes, which will be most effective for a particular application will depend upon the application, the wastewater characteristics, and the characteristics that are required to solve the particular problem. For example, microbes may be selected based on their ability to degrade pollutants on the list of Federal Priority pollutants, which is incorporated herein by reference.

The terms microorganism, microbe, or organism, as used herein, are interchangeable and, include fungus, yeast, bacteria, and other biodegrading small unicellular organisms. Some examples of microbes with particular biodegradation characteristics are provided in Table 1.

TABLE 1

| Microbe | Respiration Type | Application Example | End Product Example |
|---|---|---|---|
| *Pseudomonas putida* | Aerobic | Phenol, toluene | Water, $CO_2$, biomass |
| *Bacillus subtilis* | Aerobic | Starch | Water, $CO_2$, biomass |
| *Nocarida* spp. | Aerobic | Cyclohexane | Water, $CO_2$, biomass |
| White Rot Fungus spp. | Aerobic | Chloro-organics | Water, $CO_2$, biomass |
| *Nitrosomonas* spp. | Aerobic | Ammonia oxidation | Nitrite |
| *Nitrobacter* spp. | Aerobic | Nitrite oxidation | Nitrate |
| *Thiosphera pantotropha* | Aerobic | Denitrification | Nitrogen gas |
| Methanogenic bacteria | Anaerobic | Acetic acid | Methane, $CO_2$, biomass |

Notes:

Spp. = species, these can vary; *Subtilis* is one species of *Bacillus*; *Putida* is one species of *Pseudomonas*; $CO_2$ = carbon dioxide.

Examples of microbes such as *Pseudomonas putida* and *Nocardia* strains for the biodegradation of hydrocarbons are well documented in "Developments in Biodegradation of Hydrocarbons-1" by Watkinson, Applied Science Publishers, 1978 ISBN: 0-85334-751-4, which is incorporated herein by reference. Chloro-organics biodegradation using White Rot Fungus is well documented in U.S. Pat. No. 4,554,075, which is incorporated herein by reference. Culture methods are discussed in "Increasing Ligninolytic Enzyme Activities in Several White-Rot Basidiomycetes by Nitrogen Sufficient Media" Erwin et al., Biosource Technology, Volume 53, (1995), pages 133-139, Elsevier Science Limited, which is incorporated herein by reference. The biodegradation activities of the other microbes listed above are all well documented in Bergey's "Manual of Systematic Bacteriology", along with many other useful microbes.

(Bergey's "Manual of Systematic Bacteriology" Williams & Wilkins, London, 1984 ISBN: 0-683-04108-8, four volumes in total published every 4 years, which is incorporated herein by reference). Any of the Culture Collections provide biodegradation characteristics for various cultures on file. Examples of catalogues of microbes that can be obtained include the American Type Culture Collection—"Catalogue of Bacteria and Bacteriophages", 17$^{th}$ edition, 1989, ISBN: 0-930009-23-1, and the "Catalogues of the National Collections of Type Cultures and Pathogenic Fungi", The Public Health Laboratory Service (PHLS), 1989, ISBN 0-901144-25-8, the disclosures of which are incorporated herein by reference.

Off-the-shelf products can be bought from USA Manufacturers previously mentioned such as Novozymes, Polybac Corporation, InterBio Inc., or Sybron Corporation. When treating wastewater for phenol contamination, for example, one could buy Phenobac from Polybac Corporation, or CX80 from InterBio Inc., or Bichem 1002 CG from Novozymes or Sybron Corporation. All these products are claimed, by the manufacturer, to biodegrade phenol.

Standard microbiological isolation methods described in "Identification Methods in Applied and Environmental Microbiology" by Board et al. can be used for isolation and identification of indigenous microbes from samples obtained from the site. ("Identification Methods in Applied and Environmental Microbiology", R. G. Board, Dorothy Jones, and F. A. Skinner, Blackwell Scientific Publications, London, 1992 "The Society for Applied Bacteriology Technical Series No. 29," ISBN: 0-632-03379-7, the disclosure of which is incorporated herein by reference.).

Many suitable media can be obtained commercially from Oxoid of Hampshire, England, or Difco of Detroit, Mich., distributors of media including non-selective media such as plate count agar (PCA). Alternatively, selective media can be used such as *Pseudomonas* Isolation agar (PIA), which will isolate just *Pseudomonas*. Other sources of information on special culture media for isolation and identification of specific microbes includes the "Handbook of Microbiological Media," Ronald M. Atlas, CRC Press, edited by Lawrence C. Parks, ISBN: 0-8493-2944-2; and Bergey's "Manual of Systematic Bacteriology" Williams & Wilkins, London, 1984, the disclosures of which are incorporated herein by reference.

Once isolated in pure culture, identification of the microbes can be achieved through characterization procedures described in the above references. Alternatively, such isolates can be sent for identification to experts at the American Type Culture Collection (ATCC) or National Collection of Type Cultures (NCTC), where bacteria, fungi and other life forms are maintained. These Culture Collections are also an alternative source of cultures to commercially available products from U.S. companies such as Novozymes of Salem, Va.; Polybac of Bethlehem, Pa.; InterBio of The Woodland, Tex.; Sybron of Birmingham, N.J.; or other manufacturers of biological products. One advantage of sourcing microbes from a manufacturer is that microbes can be obtained as single cultures or blended into specific formulations for different applications, such as oil degradation or treatment of pulp and papermill wastewater.

Determining which culture or manufacturer's formulation is the most effective for treating a particular wastewater can be done using standard respirometric techniques. The principle of respirometry is to measure the activity of a biomass exposed to a test substrate compared to a control containing biomass and a known substrate which gives a predictable result. The substrate to be tested can range from a specific chemical or waste stream to a combined wastewater. Respirometry experiments can be set up to stimulate either aerobic or anaerobic environments. Typical applications of respirometry include assessing the following: treatability of municipal and industrial wastewater; toxicity of specific waste streams or chemicals; biodegradability of chemicals; biochemical oxygen demand (BOD); and oxygen uptake rates (OUR).

Aerobic microorganisms use oxygen to grow and to metabolize organic substrates. For aerobic microbes, oxygen uptake rate (OUR) is considered to be directly related to organic stabilization, and hence, related to the ability of the formulation to biodegrade the organic waste.

Respirometry equipment and treatability procedures for both aerobic and anaerobic studies can be obtained from manufacturers in the U.S. such as Challenge Environmental Systems of Fayetteville, Ark.; Arthur Technology of Fond du Lac, Wis.; and Bioscience Management of Bethlehem, Pa. Examples of aerobic treatability studies can be found in technical papers such as Whiteman, G. R., *TAPPI Environmental Conference*—"The Application of Selected Microbial Formulations in the Pulp and Paper Industry," TAPPI Environmental Proceedings, Book 1, pp. 235-238, April 1991; Whiteman, G. R., *Gwinnett Industrial Conference*—"Optimizing Biological Processes—A Look Inside The Black Box," April 1995; and Whiteman, G. R., *TAPPI Environmental Conference*—"Improving Treatment Performance with Natural Bioaugmentation", TAPPI Environmental Proceedings, Vancouver, BC, 1998; the disclosures of which are hereby incorporated by reference.

Once the effectiveness of each isolate, isolates, and/or formulation have been compared using respirometry techniques, then the best can be selected as the inoculum for the fermentation process described herein.

Nutrients include both macro-nutrients and micro-nutrients. The typical composition of a microbe is shown below in Table 2, in which it is apparent that different microbes have different compositions. Microbes also have different abilities to assimilate nitrogen into amino acids, the basic building blocks of proteins or the purine or pyrimidine bases of ribonucleic acid (RNA) and deoxynucleic acid (DNA). Therefore, different microbes have different requirements for macronutrients (nitrogen and phosphorus) and micronutrients (for example magnesium, calcium, potassium, sodium, manganese, cobalt, nickel, zinc, iron, chloride and sulfur) to optimize the fermentation process. See *Introductory Microbiology* by Levy, et al., the disclosure of which is incorporated herein by reference, for information on macronutrients and micronutrients including concentrations for fastidious (hard to grow) microbes, how to determine whether a particular micronutrient is required, and explanations of the role of nutrients in general.

TABLE 2

| CONTENT | YEAST | BACTERIA | ZOOGLOEA |
|---|---|---|---|
| Carbon (C) | 47.0 | 47.7 | 44.9 |
| Hydrogen | 6.0 | 5.7 | — |
| Oxygen | 32.5 | 27.0 | — |
| Nitrogen (N) | 8.5 | 11.3 | 9.9 |
| Ash | 6.0 | 8.3 | — |
| Empirical formula | $C_{13}H_{20}N_2O_7$ | $C_5H_7NO$ | — |
| C:N ratio | 5.6:1 | 4.3:1 | 4.5:1 |

Active biomass, mainly composed of bacteria, in a biological treatment plant contains 8-15% nitrogen for most bacteria, most typically 12-12.5%, and 2-5% phosphorus, most typically 2.3-2.6%. Phosphorus is important in the formation of adenosine triphosphate (ATP) which is how microbes store energy.

Microbes are composed of proteins, carbohydrates, fatty materials called lipids, or combinations of these substances. In particular, the proteins are used to make enzymes that are the basis of the biodegradation process. A series of reactions makes up the biodegradation process for any particular organic substance. A specific enzyme carries out each reaction. These enzymes are composed of amino acids and sometimes co-factors, usually metals, which make up the reactive sites of the enzymes where the biodegradation and conversion of an organic substance takes place. Optimally, micro-nutrients are present in sufficient quantity in order to optimize the fermentation process. Micro-nutrients include substances such as vitamins, co-enzymes, metals, or inorganic compounds required such as cofactors for the production of enzymes, coenzymes or for cell growth. For example, sulfur is required for the assimilation of the essential amino acids cystiene and methionine. Information regarding the role of such micronutrients such as coenzymes, including folic acid, pantothenic acid (Coenzyme A), vitamin $B_{12}$ (cobamide), biotin, nicotinic acid or nicotinamide (NAD), vitamin B, (thiamin), vitamin $B_2$ (riboflavin), vitamin B (pyroxidine), lipoic acid and ascorbic acid is found in *Biochemistry*, Second Edition, Albert L. Lehninger, Worth Publishers Inc., 1975, ISBN: 0-87901-047-9, and *Introductory Microbiology* by Levy, et al., John Wiley & Sons Inc., 1973, ISBN 0-471-53155-3, the disclosures of which are incorporated herein by reference.

As mentioned earlier, the type of microbe or microbes used in the wastewater treatment process of the present invention depends on the type of wastewater problem to be addressed. The microbes used most often are bacteria, and most commonly, aerobic, mesophilic bacteria are used. Aerobic bacteria use oxygen to metabolize organic matter, as measured, for example, by biochemical oxygen demand (BOD), chemical oxygen demand (COD), total organic carbon (TOC), or total carbon (TC). It is also possible to use facultative bacteria, which can metabolize with or without oxygen, or anaerobic bacteria, which do not use oxygen. Bacteria are also classified with respect to the temperature at which they grow optimally. Optimum temperatures are, for thermophiles—55-75° C.; for mesophiles—30-45° C.; and for psychrophiles: obligate—5-18° C.

An example of growing a mesophilic microbe is provided as follows: The growth of an aerobic, mesophilic *Pseudomonas* in the fermentation system is maintain at the temperature of 35° C.+/−1° C., with residual dissolved oxygen concentrations of greater than 2 mg/l and pH 7.5+/−0.2 units. A typical example of a selective nutrient supplement for *Pseudomonas putida* would be phenol, which assists in selecting and favoring the growth of the *Pseudomonas* which has phenol degradation capability. Thus *Pseudomonas putida* could outgrow any background contamination and reversion is minimized. Reversion being where the plasmid coding for phenol degradation is lost by the microbe due to a competitive disadvantage by retaining unnecessary genetic material. A typical example of a selective inhibitor for *Pseudomonas* is *Pseudomonas* Isolation Broth (PIB), which contains the chemical called cetrimide that selectively inhibits the growth of other microbes, and, therefore, favors the growth of *Pseudomonas*, hence the term selective inhibitor. PIB also contains Tryptic Soya broth and various micronutrients. Such selective agents may be mixed with the main carbon source, along with macronutrients and micronutrients and other materials, such as defoamer. The main carbon source generally including concentrated simple sugars such as glucose, or molasses, or material used in the manufacturing process, such as black liquor at a Kraft mill, starch at a papermill or food plant, or beer or molasses at a brewery. At a chemical plant the main carbon source may also be a selective nutrient or inhibitor, such as phenol. The carbon is as concentrated as possible with a BOD generally of at least 5000 mg/L and typically in the region of 50,000-100,000 mg/in order to reduce raw material volumes required. Nitrogen is provided as ammonia-nitrogen or urea and phosphorus as phosphoric acid both of which are generally used at industrial wastewater treatment facilities to supplement the macronutrients nitrogen and phosphorus. Micronutrients are occasionally required where raw water supplies or the selective supplement nutrient or nutrient does not contain sufficient minerals to optimize growth.

Defoamer is sometimes be used to prevent foam build-up in the tank, which can occur in vigorous biological fermentation processes. Preferably, such defoamer is water-based or silicone based in nature with oil-based being avoided. These are readily commercially available from U.S. companies such as Callaway of Columbus, Ga.; Hercules of Wilmington, Del.; Nalco of Naperville, Ill.; and Ashland of Columbus, Ohio. Defoamer is also available at industrial sites where it is routinely applied for foam control of the biological treatment processes or to prevent foam formation on the river at the point of discharge.

The fermentation of the *Pseudomonas* is optimized at the site for the particular raw materials used in the fermentation process.

There are many characteristics of the microbial growth, which may be monitored and controlled to maintain optimal growth conditions. These growth parameters include pH, temperature, oxygen levels, conductivity, turbidity and nutrients, such as ammonia and phosphate or micronutrients such as iron or sulfur.

Optimal growth parameters are defined based on the type of microbe being grown. Using those parameters, growth conditions are set and controlled. The monitoring and control of growth parameters is carried out manually, or through an automated system (24, FIG. 1), or a remotely controlled automated system. The automated monitoring system optimally has the capacity to download data regarding the fermentation system and its parameters. For example, data on the growth parameters which are monitored during the fermentation process by on-site sensors may be downloaded at a remote location to provide the operator information about the fermentation process.

For the automated system, redundant mechanisms are preferably put in place such that the failure of a given component does not halt the fermentation process, but results in the activation of the back-up mechanism. For example, if a given pump or power source should fail, there is an automated mechanism that activates the back-up pump or back-up power, respectively. Optimally, the back-up power system is linked to a memory device so information about the stage at which power was lost is retained. In this way, when power is regained, the fermentation cycle is initiated at the correct stage of the cycle, and the fermentation cycle continues from the stage at which power was lost.

The back-up system of the automated control system is optimally equipped with a paging system or an alarm system by which an operator in a remote location is notified of a power failure or other equipment failure. From a remote location, the operator can receive notification of the failure and the activated back-up systems, and can respond accordingly.

The automated monitoring and control system eliminates the need for someone to be on-site to monitor and control the process. Through the use mechanisms such as remote downloading of data and an automatic pager system, an operator can manage a fermentation site or sites from a remote location. This also results in a decrease in the cost to run such a fermentation system.

When microbes are growing at a rapid rate, the pH can become very acidic. To maintain optimal growth conditions, the pH is neutralized. Rapid growth rates can also result in temperature variations. Real time control of temperature and pH are particularly desirable.

Oxygen consumption, as measured by oxygen uptake rate (OUR), is directly related to the rate at which the microbes are growing and degrading organics. Typical OURs for growing cultures may be about 20 mg/l/hr of oxygen, although it is possible to reach rates of 100-300 mg/l/hr of oxygen for rapidly growing cultures. It is desirable to provide aeration sufficient to supply oxygen to replace the amount being consumed. Air filters are preferably placed on the incoming air supply. The filters typically have a pore size of approximately 0.2 microns or less, and charged filters may be used. The pore size of the filter is sufficiently small to substantially reduce or eliminate contamination with microbes and particles in the air supply.

If an anaerobic bacteria is grown, the air in the fermentation tank is removed by recycling anaerobic gases and maintaining a closed pressurized system to keep air out.

The monitoring and control of various growth parameters during the fermentation process may occur locally with an option to access and control the fermentation process from a remote location. The control systems may be located in the same building or at a greater distance from the point of fermentation. In one aspect of the current invention, the growth of microbes is monitored during the fermentation by sensors measuring changes in turbidity, conductivity, temperature, pH, and/or oxygen consumption, and additional nutrients, carbon sources, selective carbon sources, oxygen levels, temperature, and/or pH are automatically adjusted to optimize growth conditions. For example, pH can be controlled by the addition of acidic or caustic materials; oxygen levels can be controlled by the addition or removal of oxygen; and nutrients and/or carbon sources can be added.

Figure 4:
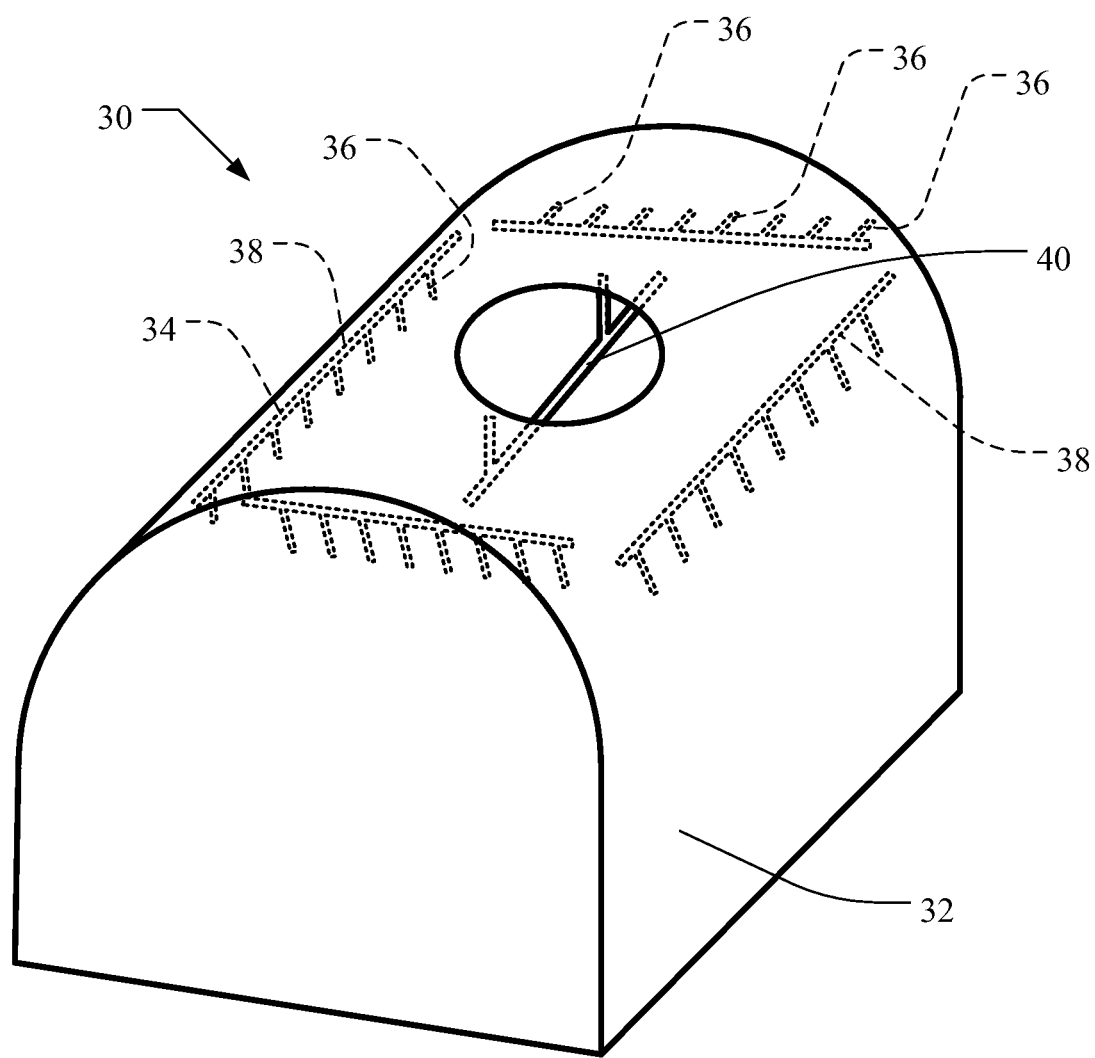

The fermentation tank is preferably washed between different batches of microbial growth to remove attached growth at the waterline, which may cause build-up of contamination. In one embodiment, the tank is washed using a spray bar mechanism 30, as illustrated in FIG. 4. The spray bar 30 is used to introduce washing or sterilization liquids, defoamer, or other liquids into the fermentation tank 32. In one embodiment, a high pressure water supply enters at the end or in middle of the spray bar 34. Water can be used from a main water line or recirculated by a high pressure pump which can also be used to transfer the bulk fluid to the point of application or the next tank in the series. The spray bar 34 can be made, for example, of ¾ inch UPVC (unplasticized poly vinyl chloride). Spray heads or sprinkler heads 36 are preferably placed such that the spray from the sprinkler heads 36 overlaps. The outer spray bars 38 is preferably located about 5" above the water line and angled down in order to achieve 30-60 psi on contact. This degree of pressure is preferred to dislodge any contamination build up at the water level. Another smaller spray bar system 40 in the center ensures the roof of the fermentation system is washed.

The tank may be cleaned with water only or by using a small amount of surfactant to assist in dislodging material off the surface of the tank. Such surfactants may be obtained from the same chemical manufacturers listed herein selling defoamers.

The fermentation tank is preferably sterilized between the growth of different batches of microbial growth, as yeast and other contaminants may be present. In one embodiment, the tank is sterilized using the spray bar mechanism comprising of the spray bar system for washing at the waterline as described above and the sprinkler system, as explained and illustrated in FIG. 4. The spray bar can be used to introduce sterilization liquids, defoamer, or other liquids into the fermentation tank.

The tank may be cleaned with water, chlorine dioxide, or by exposure to UV light. Alternatively, the tank may be sterilized with an acidic solution of pH 2 or less, such as sulfuric acid or phosphoric acid. The acidic solution is then washed out of the tank, or in the case where the tank is sterilized with phosphoric acid, after sterilization, the acid may be neutralized, retained in the tank, and used as a nutrient to provide phosphorus for subsequent microbial growth. Alkaline, or very basic, fluids can also be used for sterilization of the fermentation tank. While using either acidic or alkaline fluids, the tank may be filled to its operating level to obtain ideal and complete sterilization prior to neutralizing the pH to grow the next batch of microbes.

The washing, cleaning, and sterilization steps can be accomplished as three separate procedures, with three separate apparatus, such as spray bars, washing bars, and the like. These steps can also be accomplished as three separate steps, or fewer combined steps using the same apparatus. Additionally, variations or modifications of these procedures can be used.

The fermentation system of the present invention is capable of growing a single strain or multiple strains in a given batch. The system is also capable of growing multiple batches in a single day. In growing multiple strains, care must be taken to accommodate for differences in growth rates between the various strains. Similarly, when growing multiple batches, care must be taken to accommodate for differences in optimal growth parameters between batches.

Examples of both large scale and smaller scale fermentation systems are provided below. A preferred embodiment of each a large scale and a smaller scale fermentation system are compared in the Table 3. Examples 1-5 are generally directed to applications using the large scale fermenter, and examples 6-8 are generally directed to applications using the smaller scale fermenter.

TABLE 3

| FEATURE | LARGE SCALE | SMALL SCALE |
|---|---|---|
| Price | more expensive | less expensive |
| Electric Supply | 220 V or 240 V, 3 phase | 110 V, 220 V or 240 V, single phase or 3-phase |
| Operating Costs | high electric | low electric |
| Water warm-up time | 2-4 hours | 8-16 hours |
| Production time (Hrs/Batch) | 8 hours | 16-24 hours |
| Production time (Batches/day) | 1-3 per day | 1 per day |
| Dosage duration (Fill & draw cycle) | 2 hrs | 24 hrs to 7 days |
| Initial Inoculation (cfu/mL) | $10^6$-$10^7$ cfu/mL | $10^3$-$10^4$ cfu/mL |
| pH control | Yes | Not Required |
| Automated Feed of Nutrients and Microbes | Optional | Optional |
| Remote Monitoring | Optional | No |
| Pre-fermentation | Optional | Not Required |
| Post-fermentation | Optional | Not Required |

TABLE 3-continued

| FEATURE | LARGE SCALE | SMALL SCALE |
|---|---|---|
| Tank Size | 500-1000 gallons | 250 gallons |
| Plant size treated | 10-40 MGD | 0.1-10 MGD |

Example 1—Large Scale System in General

One aspect of the current invention is the inoculation at the application point with about 10-100 times more of the target microbes than conventional technology. With this in mind, the dosage at the point of application is optimally at least about $10^4$ cfu/mL. Based on this goal, the working volume of the main fermentation tank is optimally about $\frac{1}{500}$ to $\frac{1}{50,000}$ of the flow to be treated, while the post fermentation tank is about 2-100 times larger in working volume, and the pre-fermentation tank is about 50-500 lesser in working volume. The microbial inoculum can be about $\frac{1}{100}$ to $\frac{1}{1000}$ of the first tank used whether that is the pre-fermentation tank or the main fermentation tank. For example, for a 30 day supply of inoculum for a 40 MGD plant with a pre-fermentation tank, the inoculum required to be stored would be 1.2 gallons, or 5 gallons would last for about 3 months without replacement.

Table 4 shows the relationship between the quantity of flow to be treated and the inoculum required.

TABLE 4

| Flow to be treated | Inoculum | Pre-fermentation | Main fermentation | Post-fermentation |
|---|---|---|---|---|
| 40 MGD | 0.04 gal/batch | 4 gal | 400 gal | 4000 gal |
| 10 MGD | 0.01 gal/batch | 1 gal | 100 gal | 1000 gal |
| 1 MGD | 0.001 gal/batch | 0.1 gal | 10 gal | 100 gal |

The specifications of this particular embodiment include the following.

Tank: fiberglass, high-density polyethylene (HDPE), steel.

Heating elements: 30-90 kW per 1000 gallons for preheat and internal heat depending on incoming water temperature.

Internal heating: 5-20 kW per 1000 gallons.

Preheating can be industrial in-line heaters, or domestic water heating tanks.

Aeration: diffused air to achieve greater than 30 mg/L/hr transfer efficiency.

With the feature of multiple daily cycles, the 400 gallon tank could treat the 10 MGD flow with 2.5 cycles per day, while a 1000 gallon tank could treat the 40 MGD flow with 4 cycles per day.

The storage tank 14 used for automatic feeding of the mother culture, or original culture, into the fermentation tank 12 is diagrammed in FIG. 1. This storage system/automated feeding tank 14 allows automatic inoculation of the fermentation tank 12. Initially, the inoculum is stored in the storage system/automated feeding tank 14. With proper sterilization and cooling to about 4° C., a liquid mother culture may, optimally, be stored for a minimum of approximately 30 days. The main fermentation tank 12 is then inoculated from the storage system/automated feeding tank 14. The main fermentation tank 12 may be inoculated with a portion of the stored mother culture for the initiation of each batch of fermentation. In this case, the original mother culture is the source of the inoculant. Alternatively, at the end of the fermentation process, a sufficient amount of the contents of the main fermentation tank 12 is removed back to the storage system 14 and second transfer tank (not shown), where the contents are held while the automated feeding tank 14 is sterilized at the same time as the main tank 12. The main fermentation tank 12 is then emptied and sterilized. Then the contents of the second transfer tank are fed into the storage/automated feeding system 14 and the transfer tank is then sterilized. The automated feeding tank 14, then feeds the contents back into the main fermentation tank 12 to re-inoculate the next batch of fermentation. In the case of reinoculation, the source of inoculant is a portion of the previous fermentation batch.

A liquid or a dry inoculum may be used to inoculate the fermentation tank 12. Liquid forms may be stored in a refrigerator to extend the shelf-life for a minimum of 10 days. Optimally, the alternative dry forms of preserved microbes have a shelf life of at least 6 months and are stored in sufficient quantity in the automated feed system that manual replacement of the dry forms of preserved microbes for inoculation of the fermentation system is only minimally required. Optimally, manual replacement is required not more often than once about every 30 days. Where a pre-fermentation system is used, the dry forms may be packaged in dissolvable, gel capsules for easier measurability and automated feeding.

The microbes used in the fermentation process may be exogenous, commercially available products or indigenous microbes isolated from the treatment system.

The pre-fermentation tank 16 is illustrated in FIG. 1. The use of a pre-fermentation tank 16 permits a reduction in the amount of inoculum required for the main fermentation tank 12 and the degree of storage required. For example, the main fermentation tank 12 is a 4000 gallon tank, and sufficient inoculum is needed to achieve $10^7$ cfu/ml in the 4000 gallon volume on a daily basis for 30 days. That would require, for example, 40 gallons of a $10^9$ cfu/m inoculum each day. Without the use of a pre-fermentation tank 16, this requires the storage of 1200 gallons of inoculum for a 30 day supply. The use of a pre-fermentation tank 16, in which inoculum is grown from $10^7$ to $10^9$ cfu/ml, or 100 fold, allows reduction of the stored inoculum 100 fold down to 12 gallons. In this case, 0.4 gallons of the $10^9$ cfu/ml culture are used to inoculate 40 gallons each day. The 40 gallon volume is then grown from $10^7$ to $10^9$ cfu/ml, or 100 fold, each day. The 40 gallon volume at $10^9$ cfu/ml is then used to inoculate the 4000 gallon main fermentation tank 12 to a starting concentration of $10^7$ cfu/ml.

The use of a subsequent or post-fermentation tank 18, permits additional flexibility and an increased dosage at the point of application, in a manner similar to that illustrated with the pre-fermentation tank 16. Inoculation from a post-fermentation system 18 or holding tank 20 is preferable for single pass lagoon systems where there is no internal recycle of the biomass, and hence inoculation of the incoming flow on a continuous basis is critical to optimize the treatment.

A holding tank 20 is used when storage of the fermentation batch is desired before the batch is delivered at the point of application. Although the post-fermentation tank 18 may be used as a holding tank 20, the holding tank 20 does not require heating, aeration, mixing, or nutrients supplied, as do the fermentation tanks.

An alternative mode of operation to batch fermentation is continuous fermentation. Generally, industrial manufacturing processes using fermentation such as brewing, pharmaceuticals, and production of enzymes and microbes are batch fermentation processes. The reason industry has adopted batch fermentation over continuous fermentation is the reliability of quality control and ability to easily deal with unwanted contaminating microbes, which may ruin the end-product. In one aspect of this invention, continuous fermentation may be possible in certain circumstances, where only one microbe is required and contamination can be controlled for extensive lengths of time, for example in excess of 10-30 days. Continuous fermentation would largely eliminate the need for post-fermentation 18 or holding tanks 20 to feed the inoculum continuously. Alternatively, batches may be grown and continuously fed after some predetermined time into the growth cycle, until the next batch was to be fed. For example, a batch could be grown for 6 hours, fed continuously for 18 hours gradually draining the tank, and the process started again the next day. Alternatively to gradually draining the tank, water, carbon sources, and nutrients could be introduced at a constant rate, approximately equal to the rate at which inoculum is being fed to the application point with the whole tank being dumped at the end of the fermentation cycle. This prevents washout or depletion of the microbes, so the microbes are not depleted in excess of their ability to grow to the desired concentration.

Example 2—System for Sine Pass Lagoon System

In a single pass lagoon system, the influent is first directed to a primary clarifier in which solids are allowed to settle. Then the wastewater is passed through an aerated lagoon, and then into a settling pond, before discharge. In the single pass system, there is a continuous flow of wastewater, and therefore, continuous treatment is desired so that each part of the waste steam is treated.

In a plant with a 14 MGD flow, a single pass lagoon system is inoculated from a 1000 gallon tank containing a concentration of $1.4 \times 10^9$ cfu/m microorganisms. The initial concentration of microorganisms in the inoculated 4 million gallon aeration tank is $10^5$ cfu/ml. Typically $10^5$ to $10^7$ cfu/ml microorganisms can be recovered from a single pass lagoon. The inoculum is therefore sufficient to obtain almost immediate treatment. If the lagoon has a 3 day design residence time and the inoculum is added to the waste stream at the front end, then the effect is seen in the effluent in three days, or in the length of the residence time. The effect is generally measured by determining the biological oxygen demand (BOD), chemical oxygen demand (COD), total organic carbon (TOC), or total carbon (TC) in the effluent.

NPDES permits for wastewater are generally in units of maximum allowed pounds per day (lbs./day) of BOD and a maximum monthly average. The daily maximum is usually two times the monthly average.

Without any treatment, the discharge from the plant releases approximately 30,000 lbs./day BOD. Optimally, a wastewater treatment system reduces the BOD by approximately 90 percent. The permit for the plant sets limits at 6,000 lbs./day BOD as a monthly average and 12,000 lbs./day BOD as a daily maximum. With the single pass lagoon system currently in place, the plant is releasing wastewater with 7,000-15,000 lbs./day BOD, and is not in compliance with the NPDES permit. When treatment is implemented with the fermentation system of the current invention, the effluent is down to 3,000 lbs./day BOD in 3 days.

The waste stream is dosed either at the front end of the lagoon, or at the middle or back end of the lagoon, or at multiple sites.

In a single pass lagoon system, the dose of inoculum at the point of application is optimally at least about $10^4$ cfu/ml. The concentration of microbes at the point of application may be from about $10^4$ to $10^6$ cfu/ml, alternatively it may be about $10^5$ to $10^8$ cfu/ml, or about $10^6$ to $10^8$ cfu/ml, or about $10^7$ to $10^8$ cfu/ml, or about $10^4$ to $10^7$ cfu/ml, or about $10^4$ to $10^6$ cfu/ml, or about $10^4$ to $10^5$ cfu/ml. The concentration of microbes in the inoculant is optimally about $10^9$ to $10^{10}$ cfu/ml. The concentration of microbes in the inoculant may be about $10^8$ cfu/ml, or about $10^7$ cfu/ml, or about $10^6$ cfu/ml. Depending on the dose of the inoculum, it may be possible to see a turn around in a single pass lagoon system within about 5-7 days, or within less than about 5 days, or within less than about 4 days, or within less than about 3 days, or within less than about 2 days, or within about 1 day, or within the residency time of the lagoon system.

Example 3—System for Activated Sludge System

In an activated sludge system, the influent is delivered to a primary clarifier in which solids are allowed to settle. The wastewater then passes to an aerated basin, and then to a secondary clarifier where sludge is recycled to pass through the aerated basin again. Due to the recycling in the activated sludge system, a holding tank is not necessary, although it may be desired as a back up.

In a typical activated sludge system, it may take 14 to 30 days to see an effect of bioaugmentation due to the low rates of inoculation of microbes. Using the multistage fermentation system of the present invention, an effect is seen in approximately 5 days. In a small plant (smaller wastewater flow) with a large fermentation tank, allowing a larger inoculum, an effect is seen in as little as 24 to 48 hours.

For example, a plant with an activated sludge system to treat its wastewater is treated using the fermentation system of the present invention. The plant has a 4 million gallon aeration tank which is inoculated from a 1000 gallon tank containing a concentration of $4 \times 10^9$ cfu/ml microorganisms. The initial concentration of microorganisms in the inoculated 4 million gallon aeration tank is $10^6$ cfu/ml. The microorganisms contained in the inoculum have a generation time of approximately 30 minutes under ideal conditions, requiring 10 generation times, or about 5 hours, to grow 1000 fold. Typically, $10^6$ to $10^7$ cfu/ml can be recovered from an activated sludge system containing a healthy biomass, and occasionally, a higher concentration can be recovered. In this case, the system can be turned around and brought into compliance within a day.

In an activated sludge system, the dose of inoculum at the point of application is optimally at least about $10^4$ cfu/ml. The concentration of microbes at the point of application may be from about $10^4$ to $10^8$ cfu/ml, alternatively it may be about $10^5$ to $10^8$ cfu/m, or about $10^6$ to $10^8$ cfu/ml, or about $10^7$ to $10^8$ cfu/ml, or about $10^4$ to $10^7$ cfu/ml, or about $10^4$ to $10^6$ cfu/ml, or about $10^4$ to $10^5$ cfu/ml. The concentration of microbes in the inoculant is optimally about $10^9$ to $10^{10}$ cfu/ml. The concentration of microbes in the inoculant may be about $10^8$ cfu/ml, or about $10^7$ cfu/ml, or about $10^6$ cfu/ml. Depending on the dose of the inoculum, it may be possible to see a turn around in an activated sludge system within about 5-7 days, or within less than about 5 days, or within less than about 4 days, or within less than about 3 days, or within less than about 2 days, or within about 1 day, or in less than 1 day.

Example 4—Automated Fermentation System

Figure 5:
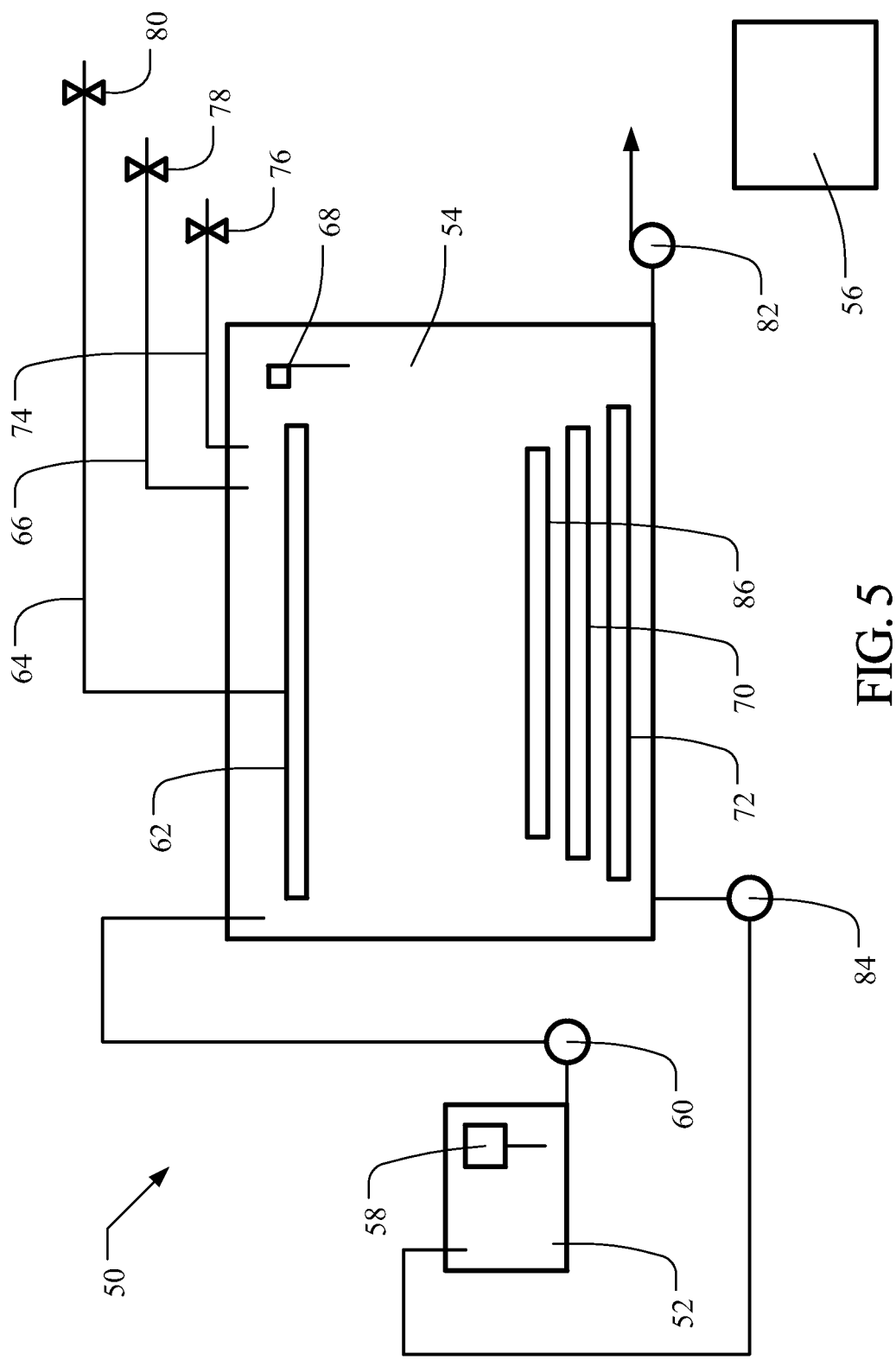

One embodiment of an automated system 50 is shown in FIG. 5. In this system there is a storage tank 50 for holding and maintaining the inoculum (this tank may also be referred to as the inoculum tank), a fermentation tank 54, and a control unit 56.

The inoculum tank 52 is used to hold and maintain the inoculum, which contains the microbe that is being used to treat the waste water system. The tank 52 is intended to hold and maintain inoculum for at least a week, at least a month, and perhaps longer than a month. Optimally, the tank 52 is covered and temperature controlled. The tank may be made from any material known to those skilled in the art that is compatible for such uses. For example, the inoculum tank 52 may be made from fiberglass, high-density polyethylene or steel. Optimally, the tank has a probe or probes 58 that measure temperature, oxygen level, pH, turbidity, conductivity, ammonia and other conditions necessary to maintain for optimal growth or that show the amount and viability of the microbes that make up the inoculum. The signals from the probe or probes 58 are then communicated to the control unit 56, which monitors and controls the system. A pump 60 is associated with the inoculum tank 52. This pump 60 is used to transfer the inoculum to the fermentation tank 54. The pump 60 has relays, sensors, or monitors that are in communication with the control unit 56. The control unit 56 monitors and operates, i.e., turns on and off the pump. The pump 60 is any suitable metering pump. In this way, the time of pump operation can be equated to a specific volume of inoculant transferred to the fermentation tank 54. Although the embodiment in FIG. 5 shows a single inoculum tank 52 it should be understood that multiple inoculum tanks may be used to have the ability of having different microbes as the inoculant, or in the alternative, a mixture of microbes may be used in a single inoculum tank 52.

The fermentation tank 54 is generally larger than the inoculum tank 52. The fermentation tank 54, as with the inoculum tank, optimally is covered. The fermentation tank 54 preferably has a spray bar 62, a feed line 64 to the spray bar, a water feed line 66, a probe or probes 68, a heating element 70, an aeration element 72, and a nutrient feed line 74.

One embodiment of the spray bar 62 is illustrated in greater detail in FIG. 4. The spray bar 62 is used to deliver various liquids into the fermentation tank 54. Such liquids include, but are not limited to, liquids used for washing or sterilizing the fermentation tank, liquids for neutralizing or controlling the pH of the contents of the fermentation tank, or defoamer. The liquid is provided to the spray bar 62 through the feed line 64, and the flow in to the feed line 64 can be controlled by a valve 80. The water line 66 is used to deliver water into the fermentation tank 54. The flow into the water line 66 can be controlled by a valve 78.

A probe or probes 68 can be positioned external to the fermentation tank and flow may be delivered by a pump recycling the contents of the fermentation tank 54 past the probe or probes 68, such that the probes 68 are able to detect various characteristics of the contents of the fermentation tank 54. Alternatively, a probe or probes 68 may be located within the tank 54 for detecting various characteristics of the contents. The probes 68 may detect temperature, pH, oxygen levels, conductivity, turbidity, nutrient levels, or other variables useful in monitoring and controlling the growth of the microbes. Optimally, the probes 58, 68 are in communication with the control unit 56 so that the control unit 56 can be used to send an appropriate signal to cause a change in the growth conditions in the fermentation tank 54. For example, the probes 68 may be in communication with the control unit 56, which in turn may control the valves and other devices which regulate the temperature, pH, nutrients, and other growth parameters.

The heating element 70 is used to control the temperature of the fermentation tank 54. Depending on the conditions, and whether heating or cooling is required, this element 70 may be a cooling rather than heating element. Additionally, instead of an element 70, a jacketed tank may be used, or other types of temperature control apparatus may be used.

Air is supplied through a gas transfer system or aeration element 72 which may deliver oxygen into the fermentation tank 54, as in the case of growing aerobic microbes. The aeration may provide sufficient mixing of the contents of the fermentation tank 54. Alternatively, mixing may be provided by a separate mixing device 86. Optimally, the oxygen levels in the fermentation tank 54 are controlled. In the case of growing anaerobic microbes, the gas transfer system 72, instead of delivering oxygen to the fermentation tank 54, is used to pull gas out of the fermentation tank headspace via connection to a pump (not shown).

A nutrient feed line 74 is used to deliver nutrients, including micro-nutrients, macro-nutrients, and carbon sources, into the fermentation tank 54. The flow of nutrients into the nutrient feed line 74 may be controlled by a valve 76.

The flow of the inoculum out from the fermentation tank 54 is controlled by a pump 82. The inoculum may flow from the fermentation tank 54 to another tank or tanks (not shown), to the point of application, or to some other location. The flow of the inoculum from the fermentation tank 54 back into the inoculation tank 52, is controlled by pump 84. At the end of a fermentation batch, an amount of the batch may be redelivered back into the inoculation tank 52 to be used to inoculate a subsequent microbial growth batch.

Example 5—Automated Multi-Tank Fermentation System

Figure 6:
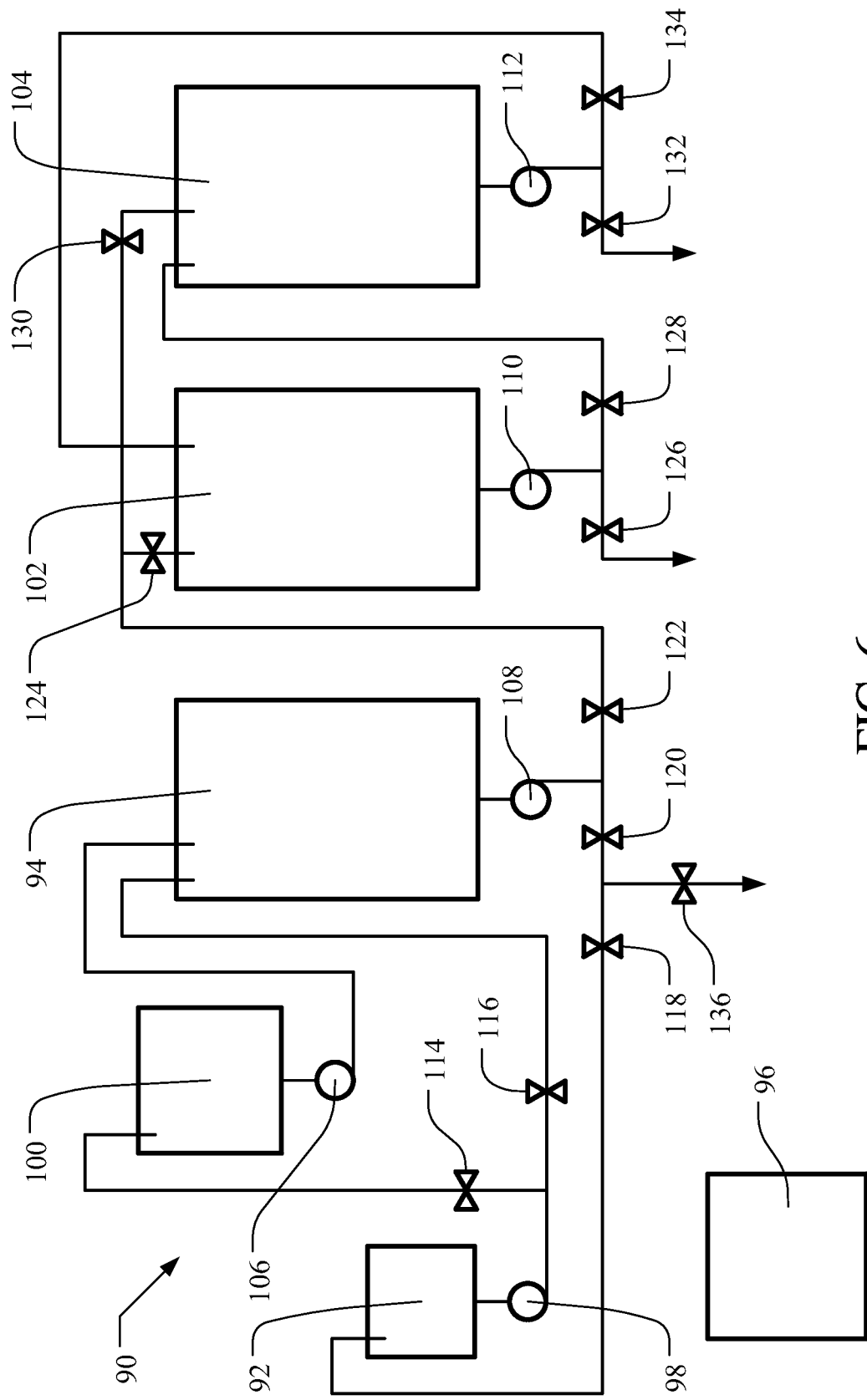

One embodiment of a multistage tank system 90 of the present invention is illustrated in FIG. 6. In this system there is a storage tank 92 for holding and maintaining the inoculum, this tank may also be referred to as the inoculum tank 92, a fermentation tank 94, a control unit 96, which monitors and controls the system, a pre-fermentation tank 100, a post- or subsequent fermentation tank 102, and a holding tank 104. This embodiment, employing a series of fermentation tanks permits a reduction in the amount of inoculum required to be stored in order to operate the fermentation system, because the inoculum is allowed to grow through a greater number of generations before delivery at the point of application.

As in Example 4, a pump 98 is associated with the inoculum tank 92. This pump 98 is used to transfer the inoculum to the fermentation tank 94, or to the pre-fermentation tank 100, or to a combination of the two. A valve 114 controlling the flow from the inoculum tank 92 to the pre-fermentation tank 100 and a valve 116 controlling the flow from the inoculum tank 92 to the main fermentation tank 94, allows control of the flow of inoculum. When the valve 114 controlling the flow from the inoculum tank 92 to the pre-fermentation tank 100 is open, the inoculum flows to the pre-fermentation tank 100 when the pump 98 associated with the inoculum tank 92 is on. The inoculum is allowed to grow in the pre-fermentation tank 100 for a number of generations. There is a pump 106 associated with the pre-fermentation tank 100 which controls the flow of inoculum from the pre-fermentation 100 tank to the main fermentation tank 94.

From the main fermentation tank 94, the inoculum may flow into a post-fermentation tank 102, a holding tank 104, a point of application, or back into the inoculum tank 92. There is a pump 108 associated with the main fermentation tank 94 for controlling flow out of the main fermentation tank 94.

For flow from the fermentation tank 94 into the post-fermentation tank 102, the main fermentation tank-associated pump 108 is on and the valves 122, 124 leading from the main fermentation tank 94 to the post-fermentation tank 102 are open.

For flow from the fermentation tank 94 into the holding tank 104, the main fermentation tank-associated pump 108 is on and the valves 122, 130 leading from the main fermentation tank 94 to the holding tank 104 is open. If flow is desired only into the holding tank 104, and not the post-fermentation tank 102, the valve 124 controlling flow into the post-fermentation tank 102 is closed.

For flow from the fermentation tank 94 to the point of application, the main fermentation tank-associated pump 108 is on and the valves 120,136 leading from the main fermentation tank 94 to the point of application are open.

For flow from the fermentation tank 94 to the inoculum tank 92, the main fermentation tank-associated pump 108 is on and the valves 118, 120 leading from the main fermentation tank 94 to the inoculum tank 92 are open. If flow is desired only from the fermentation tank 94 to the inoculum tank 92, the valves 122, 136 controlling flow from the fermentation tank 94 to the post-fermentation tank 102, the holding tank 104, and the point of application are closed.

The inoculum can be transferred from the post-fermentation tank 102 to the holding tank 104 or to the point of application. There is a pump 110 associated with the post-fermentation tank 102.

For flow from the post-fermentation tank 102 to the holding tank 104, the post-fermentation tank-associated pump 110 is on, and the valve 128 which controls the flow from the post-fermentation tank 102 to the holding tank 104 is open. If flow is desired only from the post-fermentation tank 102 to the holding tank 104, the valve 126 which controls the flow from the post-fermentation tank 102 to the point of application is closed.

For flow from the post-fermentation tank 102 to the point of application, the post-fermentation tank-associated pump 110 is on, and the valve 126 which controls the flow from the post-fermentation tank 102 to the point of application is open. If flow is desired only from the post-fermentation tank 102 to the point of application, the valve 128 which controls the flow from the post-fermentation tank 102 to the holding tank 104 is closed.

The inoculum can be transferred from the holding tank 104 to the point of application or to the post-fermentation tank 102. There is a pump 112 associated with the holding tank 104 for controlling flow out of the holding tank 104.

For flow from the holding tank 104 into the post-fermentation tank 102, the holding tank-associated pump 112 is on and the valve 134 leading from the holding tank 104 to the post-fermentation tank 102 is open. If flow is desired only into the post-fermentation tank 102, and not the point of application, the valve 132 controlling flow from the holding tank 104 to the point of application is closed.

For flow from the holding tank 104 to the point of application, the holding tank-associated pump 112 is on and the valve 132 leading from the holding tank 104 to the point of application is open. If flow is desired only to the point of application, and not to the post-fermentation tank 102, the valve 134 controlling flow from the holding tank 104 to the post-fermentation tank 102 is closed.

A smaller scale fermenter is used primarily for non-emergency upset conditions and general maintenance of biomass health for the application previously described for the large fermentation system including BOD removal and filamentous bulking control. Individually, such a system can be used, for example, to treat smaller treatment systems, grease traps, drain-lines, lift stations, and septic tanks, or several systems can be deployed to treat a large lagoon system with a large flow. The fermentation process can also be used to grow batches of microbes which are harvested and dispensed into smaller containers, such as 1 gallon containers, for use as a drain line maintenance product for grease traps or bioremediation or starter culture for septic tanks. Larger 5-50 gallon batches or the whole 250 gallon tote can be deployed by service companies operating wastewater treatment systems (municipal or industrial), which have lift stations in which grease build-up is a problem. Service companies of Hazmat teams can also use the smaller system to bioremediate small spills of organics, contaminated sites or underground storage tanks containing contaminated water.

Generally, a fermenter of this type includes a tank, aeration, and a controller. In one embodiment of a smaller scale fermenter, the tank is preferably a 250 gallon tote that is skid mounted, moveable, and shippable. The aeration pump is preferably exterior to the tank, and an aspirator such as an Eco aspirator from Aquatic Eco-Systems Inc. may optionally be used. The controller in this particular embodiment is a modular controller comprising a timer, relays for switching devices on and off, a manual on-off switch, a temperature sensor and float connected to heating elements to heat the liquid, which connects to a regular domestic electricity supply such as 110V, 230V or 460V in the USA, or 240V or 480V in Europe. Internal electronic circuits cay be operated off 12V using a transformer or electronic device to step down the voltage. A discrete or continuous level sensor device with an liquid crystal display (LED) can also be added to the modular controller to control the process primarily by monitoring the level of liquid rather than by time. The modular controller controls the fill and drain cycle and mixing and aeration by opening and closing solenoid valves. Heating elements are switched on and off according to temperature, and for safety purposes at low level using a float or other level-measuring device such as a pressure transducer. Temperature can be controlled using a fixed or variable thermostat. A pump is used to recirculate the contents, optionally through an aspirator (preferably, with no moving parts), for efficient aeration and trouble-free operation. The pump also acts to discharge part or all of the contents of the tank when the timer opens the discharge circuit.

The smaller scale fermenter can be used as a manual system with an optional upgrade to automate various features for the filling cycle, draining, and feeding of nutrients and microbes. The smaller scale fermenter can also be used for bioremediation of soil at contaminated sites or for spill response of Hazmat Teams or bioremediation of organic contaminants in underground storage tanks. For small bioremediation jobs of less than 100 cubic yards or the other applications described above, a smaller system consists of a shippable, watertight, 5-gallon plastic container as the fermentation tank, an initial microbial inoculum in a gelatin capsule, a pack of nutrient, an aquarium heater, air pump and diffuser for aeration. The fermentation tank is filled with 5-gallons of city water and the nutrient pack and microbial inoculum are added. The aquarium heater is inserted inside the container along with air stones to diffuse air through the liquid to provide oxygen and mixing. The contents is preferably fermented for 8-24 hours before use.

Another example of an application of the small automated system is for treating grease traps or grease build-up in drain lines and as a general treatment method for drain line maintenance for removing and reducing accumulation of organic matter. This system comprises a controller and a chamber for growing microbes with a mixing and/or aeration device, such as an air stone and air pump for aeration and mixing with an automated dispensing system of microbes and nutrient in a single gel capsule or in separate capsules. The controller controls the addition of city water and the dispensing of the capsules into the fermentation tank. The fermentation process then proceeds at room temperature over a 18-24 hour period before the contents are flushed into a drain line, for example, in a drain line of a restaurant after the restaurant is closed or after sanitization of the kitchens is complete.

The size of these smaller fermentation tanks, chambers or vessels are preferably about 0.25 gallons to about 250 gallons, with typical sizes of 5 for small bioremediation applications, 55 and 250 US gallons for wastewater treatment systems, lift stations and large bioremediation sites, and preferably about 1 liter for drain line maintenance at restaurants.

These small 110V systems can be deployed more economically than the larger automated systems. For example, four individual 250-gallon systems are deployed to treat flows of 10-40 MGD. This is particularly useful where the systems are single pass lagoons covering a number of acres. In such a case, several dosing points allow treatment to proceed simultaneously across a lagoon which could hold 10-20 days of water which does not meet the environmental requirements for discharge. For example, in a lagoon or holding pond, three 250-gallon fermentation systems could be set-up at equidistant intervals from the back of the basin with the last system treating a volume or area equivalent to one days discharge of water. A fourth 250-gallon tank would be placed at the front of the system to treat the new incoming wastewater.

Nutrients and microbes can be packaged in gelatin capsules or in water soluble bags. Preferably the nutrients are packaged in water-soluble bags, and the microbes are packaged in gelatin capsules. Packages of nutrients and of microbes can be purchased from Advanced Biological Services Inc, Duluth, Ga. (www.waste-water.com). Sterilizing and cleaning agents such as sodium hypochlorite solution (i.e. bleach) or commercially available cleaners in solid form can also be packaged water-soluble bags or capsules. Liquid cleaners can be packaged in small dispensing bottles. These cleaners and sterilizing agents are used by the operator to sterilize or minimize contamination build-up over time in the fermentation process. For example, the tank can be filled with water and a 0.5 to 1 lb. bag can be applied to 250 gallons of water and left for 1 hour. The contents of the tank can then be emptied and the tank flushed with clean water before filling with water used to grow the microbes.

Example 6—Daily Batch of 250 Gallons Treating 2-10 MGD Flow-Manual

Figure 7:
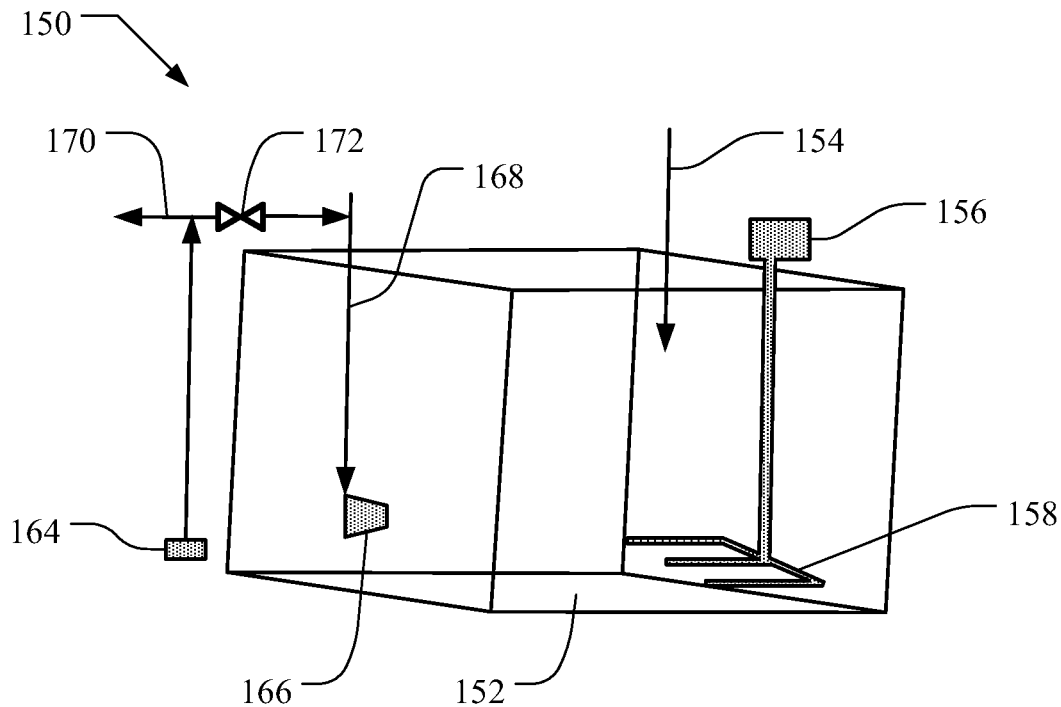

As illustrated in FIG. 7, the fermentation tank 152 is filled manually with 250 gallons of water by opening valve 154. The water can be city water, water from the factory, non-contact cooling water, primary effluent with low solids of less than 50 mg/L total suspended solids (TSS), or final effluent with less than 50 mg/L (TSS). There is a main on-off control box 156 for power to the heaters and pump. As the water reaches the 250-gallon mark on the tank 152 the operator closes water valve 154 to stop water entering. As the tank 152 is filling, the heater elements 158 come on at about 10-15% of full (25-30 gallons). The operator then adds 2-10 lbs of nutrient 160, preferably in water-soluble bags (individually weighing 0.5, 1, or 2.5 lbs each. The nutrient bags can contain dissolvable gelatin capsules of 0.5, 1, 2 or 3 oz size containing the microbial inoculum 162 as well or be packaged separately. The pump 164 recirculates the water, nutrient and microbe mix, optionally through an aspirator 166 which draws air in through a tube 168 and which can be located inside or outside the tank 152. The batch is allowed to ferment for at least 18-24 hours before dumping the batch to treatment system. The operator returns the following day and opens the discharge valve 170 and closes the recirculation valve 172. Alternatively this can be a 3-way valve. This causes the recirculating pump 164 to discharge the contents of the tank 152 or batch. As the tank 152 empties, the operator may open water valve 154 to flush the tank 152 and clean it out. On completion of emptying the tank 152 and washing it out the operator closes the discharge valve 170 and opens the recirculation valve 172.

Example 7-2-7 Day Cycle—1 Batch of 50 Gallons Train 0.1-2 MGD—Manual

As illustrated in FIG. 7, the fermentation tank 152 is filled manually with 250 gallons of water by opening valve 154. The water can be city water, water from the factory, non-contact cooling water, primary effluent with low solids of less than 50 mg/L total suspended solids (TSS), or final effluent with less than 50 mg/L (TSS). There is a main on-off control box 156 for power to the heaters and pump. As the water reaches the 250-gallon mark on the tank 152 the operator closes water valve 154 to stop water entering. As the tank 152 is filling, the heater elements 158 come on at about 10-15% of full (25-30 gallons). The operator then adds 2-10 lbs of nutrient 160, preferably in water-soluble bags (individually weighing 0.5, 1, or 2.5 lbs each. The nutrient bags can contain dissolvable gelatin capsules of 0.5, 1, 2 or 3 oz size containing the microbial inoculum 162 as well or be packaged separately. The pump 164 recirculates the water, nutrient and microbe mix, optionally through an aspirator 166 which draws air in through a tube 168 and which can be located inside or outside the tank 152. The batch is allowed to ferment for at least 18-24 hours before application. The operator returns the following day and opens the discharge valve 170 and closes the recirculation valve 172. Alternatively this can be a 3-way valve. This causes the recirculating pump 164 to discharge the contents of the tank 152. The operator can dispense a certain portion of the tank 152 contents according to the schedule of treatment which could be one batch every 2 days, 3 days, 4 days, 5 days, 6 days, 7 days, 8 days, 9 days, 10 days, 11 days, 12 days, 13 days, 14 days or longer. However, the maximum growth will occur in about 24 hours without further addition of nutrients and it is therefore recommended that optimally batches be fed within 7 days or more nutrient added. When the tank 152 is empty the operator may open valve 154 to flush the tank 152 and clean it out. On completion of emptying the tank 152 and washing it out the operator closes the discharge valve 170 and opens the recirculation valve 172.

Figure 8:
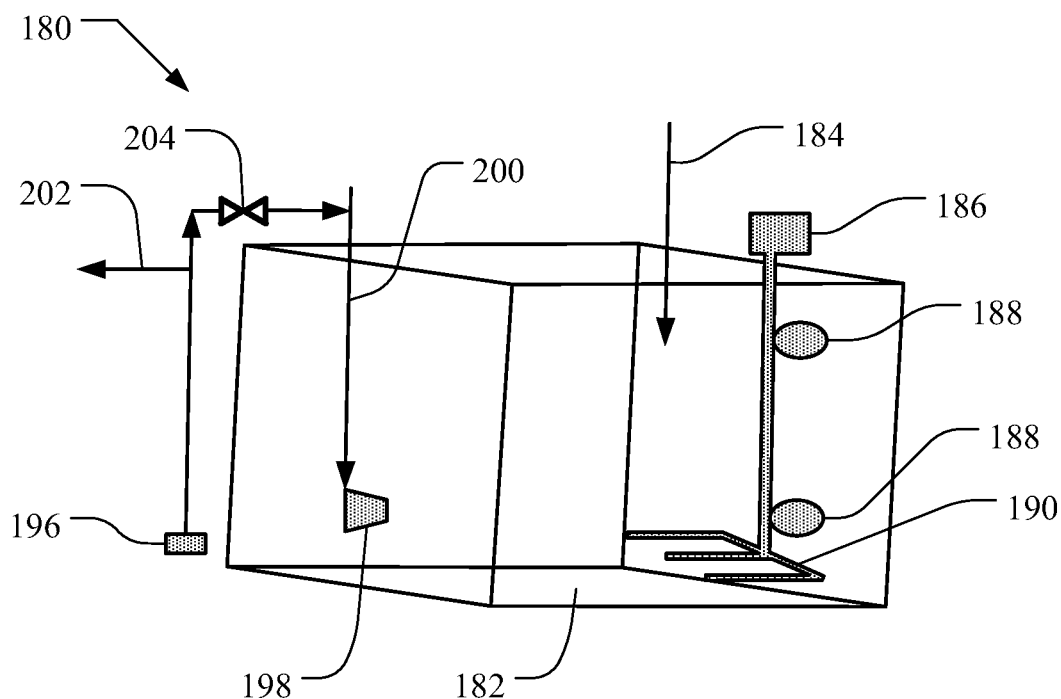

Example 8—1 Batch of 250 Gallons Treating 0.05-10 MGD Flow—Fill and Drain Cycle Automated As illustrated in FIG. 8, the fermentation tank 182 is filled automatically with 250 gallons of water at the beginning of the cycle by the opening of a solenoid valve 184 controlled by an electronic board or timer such as a garden sprinkler system 186 through a relay. As the water reaches the 250-gallon mark on the tank a high level float 188 closes valve 184 to stop water entering. As the tank 182 is filling the heater elements 190 come on at about 10-15% of full (25-30 gallons). The operator then adds 2-10 lbs. of nutrient 192 un water-soluble bags (5) individually weighing 0.5, 1 or 2.5 lbs. each. The nutrient bags 192 can contain dissolvable gelatin capsules of 0.5, 1, 2 or 3 oz. size containing the microbial inoculum 194 as well or be packaged separately. The pump 196 recirculates the water, nutrient and microbe mix, optionally through an aspirator 198 which draws air in through a tube 200 and which can be located inside or outside the tank 182. The batch is allowed to ferment for at least 18-24 hours before dispensing part or the entire batch to a treatment system. The controller 186 opens the discharge solenoid valve 202 and closes the recirculation solenoid valve 204, which causes the pump 196 to discharge the contents of the tank 182 or batch on a timed or level controlled basis. On completion of the cycle and emptying the tank 182, the operator returns to wash it out.

Example 9—Weekly Cycle—1 Batch of 250 Gallons Treating 0.5-1 MGD—Manual

As illustrated in FIG. 7, the fermentation tank 152 is filled manually with 250 gallons of water by opening valve 154. The water can be city water, water from the factory, non-contact cooling water, primary effluent with low solids of less than 50 mg/L total suspended solids (TSS), or final effluent with less than 50 mg/L (TSS). There is a main on-off control box 156 for power to the heaters and pump. As the water reaches the 250-gallon mark on the tank 152 the operator closes water valve 154 to stop water entering. As the tank 152 is filling, the heater elements 158 come on at about 10-15% of full (25-30 gallons). The operator then adds 4 bags of nutrient 160, 4 water soluble capsules containing the microbial inoculum 162, and 1 quart of defoamer. Each nutrient bag contains 2.5 lb of nutrient in a water-soluble bag. The capsules containing the microbial inoculum can be add separately or packaged with the nutrient bags. The pump 164 recirculates the water, nutrient and microbe mix, optionally through an aspirator 166 which draws air in through a tube 168 and which can be located inside or outside the tank 152. The batch is allowed to ferment for at least 18-24 hours before application. The operator returns the following day, closes the recirculation valve 172 and opens the discharge valve 170. Alternatively this can be a 3-way valve. This causes the recirculating pump 164 to discharge the contents of the tank 152. The operator dispenses a portion of the tank 152 contents according the schedule of treatment of one batch every 7 days. It is recommended that batches be fed within 7 days or more nutrient added. On completion of dispensing a portion of the tank 152, the operator opens the recirculation valve 172 and closes the discharge valve 170. When the tank 152 is empty the operator may open valve 154 to flush the tank 152 and clean it out. On completion of emptying the tank 152 and washing it out the operator closes the discharge valve 170 and opens the recirculation valve 172.

This procedure can be adapted for treating larger flows of water. In general, treatment of a larger flow or of more severe upsets or operational problems requires the discharge of a larger portion of the tank or an increase in the dosing rate. For example, the operator can dispense a certain portion of the tank 152 contents according to the schedule of treatment which could be one batch every day, 2 days, 3 days, 4 days, 5 days, 6 days, 7 days, 8 days, 9 days, 10 days, 11 days, 12 days, 13 days, 14 days or longer. However, the maximum growth will occur in about 24 hours without further addition of nutrients and it is therefore recommended that optimally batches be fed within 7 days or more nutrient added. The fermentation tank 152 may optionally be equipped with an automated discharge system. For example a positive displacement pump controlled by a timer can provide for automatic opening and closing of the discharge valve 170 and the recirculation valve 172 (or a 3-way valve, if present). Once the initial fermentation is complete, the automatic discharge system may discharge a known quantity of the tank 152 intermittently or may discharge a constant flow on a continuous basis. Table 5 shows examples of the relationship between the quantity of flow to be treated, the time per batch and the dosing rate.

TABLE 5

| Flow to be treated | Time per Batch | Dosing Rate (gal/day) |
|---|---|---|
| 10-20 MGD | 1 day | 250 |
| 5-10 MGD | 2 days | 125 |
| 2-5 MGD | 3 days | 80 |
| 1-2 MGD | 5 days | 50 |
| 0.5-1 MGD | 7 days | 35 |
| <0.5 MGD | 10 days | 25 |

Example 10—Cleaning of Fermentation Tank

The fermentation tank (152 or 182, FIGS. 7 and 8) can be cleaned periodically, preferably once a month. To carry out a cleaning cycle, the tank is completely discharged, and the top of the tank is opened. If a low level float is present, the float can be disabled or the base contents of the tank can be flushed out with water to dilute any remaining fermentation product. If the tank can be operated in an automatic or manual mode, it should be switched to the manual mode. The discharge sequence is started by engaging the main on/off switch. The tank is completely filled with water. During the filling of the tank, the on/off switch is engaged again to close the discharge valve and open the recirculation valve, and 5 gallons of bleach are added. Once the tank is filled, the bleach solution is recirculated for 2 hours. After this soak time, the on/off switch is engaged again to start the discharge sequence. The tank is rinsed and is then ready for use.

Example 11—Treatment of Grease in Wet Wells

Small scale manual fermentation systems were used to inoculate sewer system wet wells with fat, oil and grease (FOG) degrading microbes. Four categories of wet wells were defined based on flow (low or high), free water on the surface, thickness of the FOG cap and the degree and/or rate of accumulation of FOG on the surface of the water. Well A was defined as a low flow wet well with a moderate grease accumulation of 6-8 inches on the water surface. This well had only 20% or less free water, and the floats in the well were grounded. Well B was defined as a low flow wet well with a severe grease accumulation of 12-18 inches on the water surface. This well had little, if any, free water, and the floats in the well were grounded. Well C was defined as a low flow wet well with a moderate to severe grease accumulation of 8-10 inches and 20% or less free water. This well also was showing signs of a rapid increase in grease accumulation. Well D was defined as a high flow pumping station with a severe grease accumulation of 18-24 inches. This well had a water flow rate of 5 MGD.

The microbes used for each wet well were chosen to provide emulsification and degradation of the FOG into carbon dioxide and water. A generic blend of microbes for degrading FOG was used for Wet Well A and a specific culture from Novozymes called Bi-Chem LC 2009 GT for Wet Well B. Wet Well A was dosed at a frequency of 250 gallons per week for the first two weeks and then 250 gallons over 4 weeks thereafter. Wet Well B was defined as a more severe application and was dosed at 500 gallons per week. A spray distribution system was employed to effectively distribute the discharged inoculum onto the FOG.

Within 6 weeks of the beginning of treatment, Wet Well A had shown an increase in free water levels of approximately 70%, thereby not hindering floats controlling the pumps. The remaining FOG became free floating and no longer forming a hard mat across the surface of the wet well. Wet Well B became more soupy but never showed signs of water breaking. In this case it was decided that the application for commercial purposes would require the wet well to be pumped out prior to ongoing treatment so that the FOG degradation program could keep up with the rate of accumulation rather than trying to overcome historic build-up. The degradation of the FOG provides for a soupy mixture of organics, microbes and water. This mixture can then be pumped through the existing water lines, and in some cases the organics will dissolve or disperse in the water altogether. The residual microbes can continue to degrade grease throughout the sewer lines as the mixture is pumped away from the wet well. The microbes will also tend to cling to the walls and other structures causing retention in the wet well of such microbes.

There are many applications and numerous embodiments of the present invention. In addition to the embodiments specifically discussed above, some of the additional embodiments or characteristics of those embodiments are described below.

In one embodiment of the invention there is a fermentation system comprising a closed fermentation tank (with an air vent), with a spray bar and sprinkler system for introducing a fluid for sterilization of the tank, in which the contents are aerated, heated, mixed and monitored. The process can be a multi-staged fermentation process using tanks of increasing size.

The fermentation tank is optionally skid mounted and moveable by a forklift truck. The tank can also be weatherproof to the point where it can be located outside or onsite at an industrial facility without the need for further enclosure to prevent loss of functionality.

Aeration for the tank can be provided by a dedicated blower, or by using plant air at a manufacturing site. Pure oxygen can be introduced to provide supplemental oxygen through the aeration device into the fermentation tank. Air can be introduced through a fine bubble diffuser system to satisfy oxygen uptake rates of greater than 10 mg/L/hr, of greater than 20 mg/L/hr, or of greater than 30 mg/L/hr. Preferably, the aeration creates sufficient mixing to maintain the microbes in suspension. In one embodiment, the aeration device is tubular and made of vyon. The electrical energy costs for operation can by minimized by reducing the amount of aeration required for treatment.

The desired temperature of the tank depends on the type of microbe or microbes being grown. In one embodiment, the water for making up the contents of the tank is preheated to raise the temperature a minimum of about 10° C. in about one hour or less, either using domestically available water heaters or commercially available industrial in-line heaters. Alternately, the water can be preheated to raise the temperature about 25° C. in about one hour or less.

The contents of the tank can be either heated or cooled to bring the temperature into an optimum range for fermenting and growing the microbes, and the tank can be subsequently maintained at such a temperature. For example, the contents of the tank can be cooled to bring the temperature into the range of about 15° C. to about 18° C. for psychrophilic microbes. The contents of the tank can be heated to bring the temperature into the range of about 30° C. to about 37° C. for mesophilic microbes, or into the range of about 45° C. to about 80° C. for thermophilic microbes.

The fermentation process can be monitored either on site or remotely. In one embodiment, the contents of the fermentation tank are monitored during the fermentation process locally with an option to access and control the fermentation process from a remote location. The remote monitoring can occur where some control systems may be in the same building or the system may include an option to access and control the fermentation process from a remote location more than 1 mile away. The growth of microbes can be monitored during the fermentation by changes in turbidity and/or conductivity, and additional nutrients, carbon sources, or selective carbon sources can be automatically added or the temperature can be adjusted. The pH of the tank contents can also be monitored and automatically controlled to optimize the fermentation process.

The fermentation tank is preferably sterilized between the growth of different batches. The sterilization agent can be either highly acidic (phosphoric acid) or highly alkaline (caustic). The sterilization agent can also be used as a nutrient in the fermentation process, for example, phosphoric acid can be used as a sterilization agent and also provide a nutrient used in the fermentation process. The sterilization agent can also be used to control the pH of the contents of the fermentation tank, for example, phosphoric acid can be used as a sterilization agent and also used to control the pH of the contents of the fermentation tank.

In one embodiment, at the end of the fermentation process, a sufficient amount of the contents of the fermentation tank is removed to a holding tank or tanks which serve to hold the microbes while the fermentation tank is emptied and sterilized. After sterilization, the contents are automatically dumped into the main fermentation tank in order to re-inoculate the contents and initiate the next batch of microbes. The re-inoculation of microbes for the next batch can continue without manual intervention or a new mother culture for a period of at least about 5 days continuously, or for a period of about 30 days continuously.

The microbes used to initiate the batch can be grown in a smaller pre-fermentation tank about 50-100 times smaller than the main fermentation tank. The microbes grown in the pre-fermentation tank can be grown daily. The inoculum for the pre-fermentation tank can be automatically fed in the form of a fluid from a reservoir or storage vessel retaining the mother culture. Additionally, storage of the fluid mother culture can be in a refrigerated compartment to extend its efficacy for at least about 30 days.

As an alternative to a liquid mother culture, a dried culture can also be used for inoculation, The inoculum for the pre-fermentation tank can be automatically fed in the form of freeze dried microbes, with or without a carrier, contained in soluble capsules, such as gelatin, or as another form of preserved, dry material such as flakes. Alternative dry forms of preserved microbes can have a shelf life of at least about 6 months and can be stored in sufficient quantity in the automated feed system that manual replacement of the dry forms of preserved microbes for inoculation of the pre-fermentation system is required not more often than about once every 30 days. In another embodiment, dry forms of preserved microbes can have a shelf life of at least about 12 months and can be stored in sufficient quantity in the automated feed system that manual replacement of the dry forms of preserved microbes for inoculation of the pre-fermentation system is required about once every 12 months.

The fermentation system can also be adapted to a treatment system, in part, by the immobilization of the microbes on a fixed-film media, such as looped cord media, plastic packing, or other inert, high surface media on which microbes attach.

The microbes used in the fermentation process can be exogenous, commercially available products or they can be indigenous microbes isolated from the treatment system. The fermentation process can be adapted to grow different strains, types, or species of microbes during different cycles of the process. The fermentation process can be used to grow aerobic, facultative, or anaerobic microbes. The fermentation process can be used to grow lithotrophic microbes, or nitrifiers, such as *Nitrosomonas* and *Nitrobacter*, to establish and maintain nitrification in a biological wastewater treatment system.

In one embodiment, the contents of the fermentation system are used to inoculate a post-fermentation tank about 5-100 times larger than the main fermentation tank prior to being fed into the biological wastewater treatment system. The contents of the fermentation system can also be pumped into a holding tank or tanks to be transferred to the biological treatment system over the cycle period of the fermentation tank.

The fermentation system can be used for multiple cycles, or grow more than one batch per day, to ferment several different microbes, or to increase dosage rates or dose different microbes, and optionally, a holding tank can be used for each microbe. The inoculation of the fermented cultures into the biological system can occur on a daily basis, it can occurs more than once a day, or it can occur less often than daily. The inoculation from a post-fermentation system or holding tank can be used for single pass lagoon systems where there is no internal recycle of the biomass, and it is desirable to continuously inoculate the incoming flow of waste water.

The fermentation process can be used to treat aqueous liquids, including wastewater, ground water, and aqueous liquids in systems such as wet wells, drain lines, septic tanks, and underground storage tanks. For example, the inoculum can be injected into a ground water aquifer. The fermentation process can also be used to treat contaminated soil. For example, the inoculum can be applied on the soil surface, or the inoculum can be mixed with the soil surface. An aqueous liquid, by definition, is a liquid containing water, and includes pure water, contaminated water, and water containing other dissolved or dispersed solids or liquids (i.e. emulsions, solutions, dispersions). Water is typically the major component of an aqueous liquid, although the term includes liquids having only a minor component of water.

The fermentation process can be used to treat an accumulation of fat, oil and/or grease (FOG) in sewer system wet wells. The inoculum from the fermentation process can be applied to a wet well on a temporary basis to reduce or eliminate the FOG. The inoculum from the fermentation process can also be applied to a wet well on a continuous basis to maintain the FOG accumulation below a desired level.

In the treatment of relatively small and isolated systems, such as multiple wet wells or multiple areas of contaminated soil, it may be desirable to use portions of a single inoculum from the fermentation process to treat more than one site. For example, the inoculum from the fermentation process may be transferred to a mobile container, such as a tank on a truck equipped with the appropriate pumps and liquid distribution equipment. The inoculum can then be transported to each treatment site, and a portion of the inoculum can be administered to the site. In another example, a small fermentation system may be mounted on a truck or trailer. The fermentation system can then be transported to each treatment site, and a portion of the inoculum can be administered to the site from the fermentation system.

The fermentation process can be used to treat wastewater that has not yet been transferred into a biological wastewater treatment system. For example, the inoculum from the fermentation process can be applied to a wastewater in a primary clarifier.

The fermentation process can be applied to start up a biological wastewater treatment system rapidly so that the manufacturing process can continue without interruption due to restrictions caused by NPDES compliance, or by compliance with other environmental regulations of the biological wastewater treatment plant.

The production of hydrogen sulfide by sulfate reducing bacteria (SRB's) under anaerobic conditions causes major industrial problems, from odors in wastewater treatment plants, to odors in sewer lines, corrosion of sewer lines and metallic objects or structures exposed to the hydrogen sulfide. This fermentation process can be applied using microbes to stabilize the hydrogen sulfide to elemental sulfur or to sulfuric acid, generally a less desirous end-product because of issues associated with corrosion due to low pH. Microbes such as *Thiosphera pantotropha* (see also Table 1) or purple sulfur bacteria can be grown in a fermentation system and applied to the waste stream or anaerobic plant where the hydrogen sulfide is formed or where is evolves into the gaseous state. One such application would be in an ammonium sulfite/sulfate mill, such as Inland in New Johnsonville, Tenn. where sulfite/sulfate becomes converted to hydrogen sulfide upon entering the anaerobic pond. The sulfide levels in the anaerobe pond subsequently reach 800-1000 mg/L causing malodors, complaints from the local community and safety problems. When the flow from the anaerobe pond then reaches the aerobic pond energy in the form of aeration providing air causes sulfide to be converted to sulfate and residual odors associated with the splashing of the aerators. If sulfide could be converted to elemental sulfur under anaerobic conditions, then significant costs of aeration could be saved in the region of $90,000 per year, plus the potential for odor complaints from the local community would be reduced. The application of *Thiosphera pantotropha* or purple sulfur bacteria to the inlet of the anaerobe pond could solve this problem by converting the hydrogen sulfide to elemental sulfur.

Another application would be in sewer lines or forced lift mains where hydrogen sulfide accumulates and often has to be vented to costly odor treatment facilities or large amounts of chemicals such as ferric sulfate dosed to precipitate the hydrogen sulfide and prevent it entering the air or where nitrate compounds to be preferentially used by the SRB's instead of sulfate. In either case, these methods are not addressing the fundamental biological issue at hand and are extremely expensive. An on-site fermentation process could be set-up and used to apply *Thiosphera pantotropha* or purple sulfur bacteria downstream in the sewer lines to give time for the bacteria to react Over time a population would establish which would cling to the walls and surfaces of objects in the sewer line further enhancing treatment. Other applications for hydrogen sulfide include application of *Thiosphera pantotropha* or purple sulfur bacteria to anaerobic digesters, peat beds to enhance removal or air scrubbers used to strip out hydrogen sulfide.

The fermentation process can be applied to control or displace undesirable microbes, such as filamentous or Zoogloeal type microbes which cause bulking and settleability problems. The fermentation process can be used to reduce or eliminate secondary polymer and minimize the usage of dewatering chemicals and sludge handling and disposal. The process can be used to enhance removal of organic pollutants in a wastewater treatment plant as measured by biological oxygen demand (BOD), chemical oxygen demand (COD), total organic carbon (TOC), or total carbon (TC), or specific recalcitrant organic pollutants, such as those registered as Federal priority pollutants.

The fermentation process can be adapted so that sufficient microbes can be introduced into a biological wastewater treatment system in order to minimize or avoid the need for the growth phase of the biomass. By minimizing or avoiding the growth phase of the biomass in the wastewater treatment system, sludge production can be minimized or eliminated; the need for supplemental nutrients such as nitrogen and phosphorus can be minimized or eliminated; and the need for oxygen for cell growth, and the amount of aeration required for treatment can be minimized or eliminated.

The fermentation process can be adapted into a treatment system to treat liquid hazardous waste on-site on a batch basis or on a continuous basis using microbes specifically isolated to biodegrade the contaminants. The fermentation process can also be adapted into a treatment system to treat liquid non-hazardous waste using microbes specifically isolated to biodegrade the contaminants.

Depending of the system being treated and the fermentation process being used, the fermentation process can be used to turn around a plant on the verge of potential NPDES Permit violation or other environmental regulation in less than about 5 days; in less than about 4 days; in less than about 3 days; in less than about 2 days; or in less than about 1 day. Where sufficient microbes are introduced into a biological wastewater treatment system, treatment can be achieved almost immediately.

Obviously, numerous modifications and variations of the present invention are possible in light of the above teachings. It is therefore to be understood that the invention may be practiced otherwise than as specifically described herein.

The invention claimed is:

1. A method of reducing an amount of treatment chemicals required to maintain an effluent stream from a wastewater treatment plant at a predetermined level of a pollutant within permit requirements, the method comprising:
   a) determining an amount of a treatment chemical used to treat wastewater in a wastewater treatment plant to remove a pollutant from the wastewater, whereby the amount of the pollutant is reduced to a predetermined level of the pollutant in an effluent stream leaving the wastewater treatment plant;
   b) providing an on-site system for growing of microbes at the wastewater treatment plant;
   c) depositing inoculum, nutrient, and water into the on-site system, wherein the inoculum comprises microbes selected to degrade the pollutant; wherein the microbes in the inoculum are not isolated, concentrated or freeze dried;
   d) growing the inoculum in the on-site system to provide a treatment batch comprising an increased number of the microbes, the growing comprising heating and mixing the inoculum in the on-site system; whereby the treatment batch has a concentration of microbes that is at least 100 times larger than a concentration of microbes in the inoculum; and, directly applying at least a portion of the treatment batch to the waste water in the wastewater treatment plant; thereby degrading the pollutant;
   e) wherein, the determined amount of the treatment chemical can be reduced by 25% without increasing the predetermined level of the pollutant in the effluent stream leaving the wastewater treatment plant.

2. The method of claim 1, wherein the chemical is a settling aid.

3. The method of claim 1, wherein the chemical is a dewatering polymer.

4. The method of claim 1, wherein the inoculum microbes are in gelatin capsules.

5. The method of claim 1, wherein the nutrient is in gelatin capsules.

6. The method of claim 1, wherein the inoculum is selected from the group consisting of *Pseudomonas putida*, *Bacillus subtilis*, nocarida, white rot fungus and *nitrosomonas*.

7. The method of claim 2, wherein the inoculum is selected from the group consisting of *Pseudomonas putida*, *Bacillus subtilis*, nocarida, white rot fungus and *nitrosomonas*.

8. The method of claim 3, wherein the inoculum is selected from the group consisting of *Pseudomonas putida*, *Bacillus subtilis*, nocarida, white rot fungus and *nitrosomonas*.

* * * * *